United States Patent
Kim et al.

(10) Patent No.: US 10,468,706 B2
(45) Date of Patent: Nov. 5, 2019

(54) REDOX FLOW BATTERY OR FUEL BATTERY COMPRISING STORING AND COLLECTING MEANS FOR PREVENTING LEAKAGE OF REACTANT

(71) Applicant: STANDARD ENERGY CO., LTD., Daejeon (KR)

(72) Inventors: Bu Gi Kim, Daejeon (KR); Da Young Kim, Daejeon (KR)

(73) Assignee: STANDARD ENERGY CO., LTD., Daejeon (KR)

( * ) Notice: Subject to any disclaimer, the term of this patent is extended or adjusted under 35 U.S.C. 154(b) by 421 days.

(21) Appl. No.: 15/109,724

(22) PCT Filed: Dec. 31, 2014

(86) PCT No.: PCT/KR2014/013113
§ 371 (c)(1),
(2) Date: Jul. 5, 2016

(87) PCT Pub. No.: WO2015/102407
PCT Pub. Date: Jul. 9, 2015

(65) Prior Publication Data
US 2016/0329592 A1 Nov. 10, 2016

(30) Foreign Application Priority Data
Jan. 2, 2014 (KR) .................... 10-2014-0000045

(51) Int. Cl.
*H01M 8/2475* (2016.01)
*H01M 8/2484* (2016.01)
(Continued)

(52) U.S. Cl.
CPC ....... *H01M 8/2475* (2013.01); *H01M 8/0273* (2013.01); *H01M 8/188* (2013.01);
(Continued)

(58) Field of Classification Search
CPC .. H01M 8/188; H01M 8/2475; H01M 8/2483; H01M 8/2484; H01M 8/0273;
(Continued)

(56) References Cited

U.S. PATENT DOCUMENTS

| 3,861,958 A | 1/1975 | Cheron |
| 2010/0086829 A1 | 4/2010 | Ridley |
| 2013/0089767 A1* | 4/2013 | Blacker ................ H01M 8/188 429/105 |

FOREIGN PATENT DOCUMENTS

| JP | 05-343086 A | 12/1993 |
| JP | 05-343087 A | 12/1993 |

(Continued)

OTHER PUBLICATIONS

International Search Report for PCT/KR2014/013113.

*Primary Examiner* — Milton I Cano
*Assistant Examiner* — Philip A. Stuckey
(74) *Attorney, Agent, or Firm* — The PL Law Group, PLLC

(57) ABSTRACT

A REDOX flow battery or fuel battery includes a reactant storing and collecting unit for preventing leakage of a reactant. The battery includes two end plates and a stack that is disposed between the end plates and includes one or more unit cells. The reactant storing and collecting unit for preventing leakage of a reactant is disposed inside or outside the stack. According to the present invention, sealing reliability of the REDOX battery or fuel battery is dramatically improved. In addition, although a reactant or a product leaks from the stack, the reactant or the product may not leak to an outside of the battery but is collected before leaking to the outside. Therefore, the battery according to the present invention has an advantage of easy maintenance.

7 Claims, 23 Drawing Sheets

(51) Int. Cl.
*H01M 8/2483* (2016.01)
*H01M 8/18* (2006.01)
*H01M 8/2455* (2016.01)
*H01M 8/0273* (2016.01)

(52) U.S. Cl.
CPC ....... *H01M 8/2455* (2013.01); *H01M 8/2483* (2016.02); *H01M 8/2484* (2016.02); *H01M 2250/10* (2013.01)

(58) Field of Classification Search
CPC ............. H01M 8/2465; H01M 8/2455; H01M 8/2485; H01M 2250/10; Y02B 90/14; Y02E 60/528
See application file for complete search history.

(56) References Cited

FOREIGN PATENT DOCUMENTS

| | | |
|---|---|---|
| KR | 10-2001-0060112 A | 7/2001 |
| KR | 10-0905939 B1 | 7/2009 |
| KR | 10-1291752 B1 | 7/2013 |

\* cited by examiner

ABSTRACT# REDOX FLOW BATTERY OR FUEL BATTERY COMPRISING STORING AND COLLECTING MEANS FOR PREVENTING LEAKAGE OF REACTANT

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2014/013113, filed Dec. 31, 2014 which claims priority to the benefit of Korean Patent Application No. 10-2014-0000045 filed in the Korean Intellectual Property Office on Jan. 2, 2014, the entire contents of which are incorporated herein by reference.

TECHNICAL FIELD

The present invention relates to a REDOX flow battery or fuel battery comprising a reactant storing and collecting means for preventing leakage of a reactant. More specifically, the reactant storing and collecting means is installed inside or outside a stack of a REDOX flow battery or fuel battery, and it prevents a reactant from leaking to the outside of a battery.

BACKGROUND ART

Global efforts are being made to reduce the production of green house gases due to increasing environment pollution and global warming. For example, various efforts such as expansion of use of renewable energy, development of ecofriendly vehicles, and development of a power storage system that improves power supply systems have been made.

Generally, most power supply systems are based on thermal power generation that uses fossil fuels and emits a large amount of carbon dioxide, resulting in severe environmental pollution. To solve this problem, interest in development of a power supply system which uses ecofriendly energy (wind power, solar energy, tidal power, etc.) is increasing.

Since most of the renewable energies are clean energies sources occurring in nature, they are attractive and preferable in that they produce no exhaust gas associated with environmental pollution. On the other hand, they have limits because output power thereof is highly dependent on the weather or natural environments and thus dramatically fluctuates due to changeable weather or natural environments.

Electric power storage technology is a key technology for effective use of all kinds of energy including efficient use of electric power, improvement of performance or reliability of a power supply system, and spread of use of renewable energies that highly vary with time. Therefore, future development of such a technology and contribution of the technology to the public good are highly expected. Specifically, a role of a fuel battery and usability of a fuel battery in this field are increasingly expected.

A REDOX flow battery and a fuel battery differ in terms of constituent parts but are the same in that an electrochemical reaction of a reactant occurs in a cell provided with predetermined elements to produce electric charges.

In a REDOX flow battery, an electrolyte is used as a reactant. It is stored in an additional tank and supplied, through pumping operations of a pump, to a stack in which multiple cells are stacked through a channel formed in the stack, to be distributed to the cells. At this point, a pump is used to circulate the electrolyte, which causes a predetermined pressure in the stack. Generally, an inside of the stack is furnished with an anti-leaking means (gasket, O-ring, or joint) for preventing leakage of an electrolyte. In normal state, an electrolyte flows through a tank, a pump, a pipe, and a channel formed in a stack. However, an electrolyte is likely to leak from a stack due to an internal pressure of the stack and a breakdown of a sealing portion. In this case, surrounding parts may be corroded and the amount of an electrolyte in a stack changes from a preset value, which disrupts the balance of the electrolyte.

A fuel battery has a similar structure to a REDOX flow battery. That is, a reactant is supplied to a stack composed of multiple cells. Therefore, there is also a risk that a reactant may leak from a stack and surrounding parts may be corroded.

In order to inhibit leakage of a reactant, Korean Patent Application Publication No. 10-2001-0060112, titled "Polymer Electrolyte Fuel Cell", discloses a technology in which ribs are provided to around a gas supply-and-discharge hole of a flat panel gasket used to manufacture a unit cell or a stack and to around an electrode to prevent leakage of a gas. In addition, Korean Patent No. 10-1291752, titled "Combined Complex Electrode Cell with Inner Seal and REDOX Flow Battery Comprising the Same" discloses a technology in which a bipolar plate and a manifold are unified and a sealing structure is provided to a combined portion between the bipolar plate and the manifold to prevent electrolytes in an anode and a cathode from overflowing. However, this technology cannot guarantee long term sealing reliability due to change in physical properties and deformation.

SUMMARY

Accordingly, the present invention has been made keeping in mind the above problems of conventional REDOX flow batteries or fuel batteries, and an object of the present invention is to provide a REDOX flow battery or fuel battery comprising a reactant storing and collecting means provided inside or outside a stack to prevent a reactant from leaking to the outside.

In order to accomplish the object of the invention, there is provided a REDOX flow battery or fuel battery comprising a reactant storing and collecting means for preventing leakage of a reactant or a product, the REDOX flow battery or fuel battery including: two or more end plates, a stack that is disposed between the end plates and includes one or more unit cells, and the reactant storing and collecting means installed inside or outside the stack to prevent leakage of a reactant.

The unit cell may include a frame, and a membrane-electrode assembly and a separator that are disposed to be adjacent to the frame, and one or more collection channel penetration portions are provided outside the membrane-electrode assembly to form a reactant collection channel serving as the reactant storing and collecting means for preventing leakage of the reactant.

The unit cell may include a frame, and a membrane-electrode assembly and a separator that are disposed to be adjacent to the frame, and one or more collection channel penetration portions are formed outside the membrane-electrode assembly to form a reactant collection channel serving as the reactant storing and collecting means for preventing leakage of the reactant.

The unit cell may include a frame, and a membrane-electrode assembly and a separator that are adjacent to the frame; the frame is provided with one or more main channel penetration holes and an internal channel recess that connects the main channel penetration hole and the membrane-electrode assembly to each other; the main channel penetration holes form a main channel through which the reactant is supplied to the stack; the internal channel recess forms an internal channel through which the reactant is supplied from the main channel to the membrane-electrode assembly; and one or more collection channel penetration portions are formed outside the one or more main channel penetration holes to form the reactant storing and collecting means for preventing leakage of the reactant.

There are two or more collection channel penetration portions, and the two or more collection channel penetration portions are connected to the collection channel recess.

The frame may be provided with a first sealing portion and a second sealing portion, and the collection channel penetration portion may be formed between the first sealing portion and the second sealing portion.

A pressure or a material may be applied to a reactant collection channel.

A porous material may be introduced into the reactant collection channel.

An insertion member is inserted into the reactant collection channel, and the insertion member has an opening through which a leakage of the reactant is collected.

The frame may be further provided with a hollow connection member connected to the reactant collection channel.

The reactant storing and collecting means for preventing leakage of the reactant may be installed between a unit cell of the stack and a fixing unit installed in the end plate, and, the reactant storing and collecting means may be open at an upper end thereof.

The reactant storing and collecting means for preventing leakage of the reactant may be installed outside the stack, and the reactant storing and collecting means may be a case that surrounds an outer surface of the stack.

The REDOX flow battery or the fuel battery may be equipped with a reactant storage tank, the reactant may be supplied to the stack from the reactant storage tank through a reactant supply channel, and the reactant storing and collecting means may be connected to at least one of the reactant storage tank, the reactant supply channel, and a reactant discharge channel through a connection channel.

The connection channel may be connected to a pump.

When the reactant storing and collecting means is a case which surrounds an outer surface of the stack, a pressure may be applied to the reactant storing and collecting means.

A reactant analysis device may be connected to the connection channel.

The material that is analyzed by the reactant analysis device is selectively recovered to the reactant storage tank, the reactant supply channel, or the reactant discharge channel, or may be discharged outside.

The material that is analyzed by the reactant analysis device is selectively recovered to the reactant storage tank, the reactant supply channel, or the reactant discharge channel, or may be discharged outside.

The stack is provided with an anode reactant introduction hole, an anode reactant discharge hole, a cathode reactant introduction hole, and a cathode reactant discharge hole, and the stack is provided with one or more material introduction and discharge means serving as the reactant storing and collecting means for preventing leakage of the reactant.

An electrochemical reaction surface of the stack may be disposed to extend in the gravitational direction or in a substantially gravitational direction to easily collect and store the reactant.

The reactant storing and collecting means for preventing leakage of the reactant may be installed outside of the stack or outside an external channel through which an electrolyte flows, and an upper portion of the reactant storing and collecting means is open.

According to the present invention, it is possible to dramatically improve sealing reliability of a REDOX flow battery or a fuel battery.

In addition, even though a reactant leaks from a stack of a REDOX flow battery or a fuel battery, the leaked reactant is collected not to be leaked outside the REDOX flow battery or fuel battery. Accordingly, it is easy to maintain the REDOX flow battery or fuel battery.

DETAILED DESCRIPTION

Hereinafter, embodiments of a REDOX flow battery or a fuel battery comprising a reactant storing and collecting means for preventing leakage of a reactant will be described in detail with reference to the accompanying drawings.

In the following description, a REDOX flow battery is exemplarily described as an application of the present invention. However, the present invention may be applied to a fuel battery on the same purpose. That is, both a REDOX flow battery and a fuel battery include a stack in which multiple unit cells are stacked, and the unit cells of the REDOX flow battery and the fuel battery have a substantially common structure. A REDOX flow battery and a fuel battery differ only in that the REDOX flow battery uses an electrolyte as a reactant but the fuel battery uses an anode fuel and a cathode fuel (hydrogen and oxygen, respectively, in the case of a PEM fuel battery). However, since a REDOX flow battery and a fuel battery are very similar in terms of the flow of a reactant and the construction of a stack, the present invention can be applied to both of them. In the following description, an example in which the present invention is applied to a fuel battery will not be described.

Figure 1:
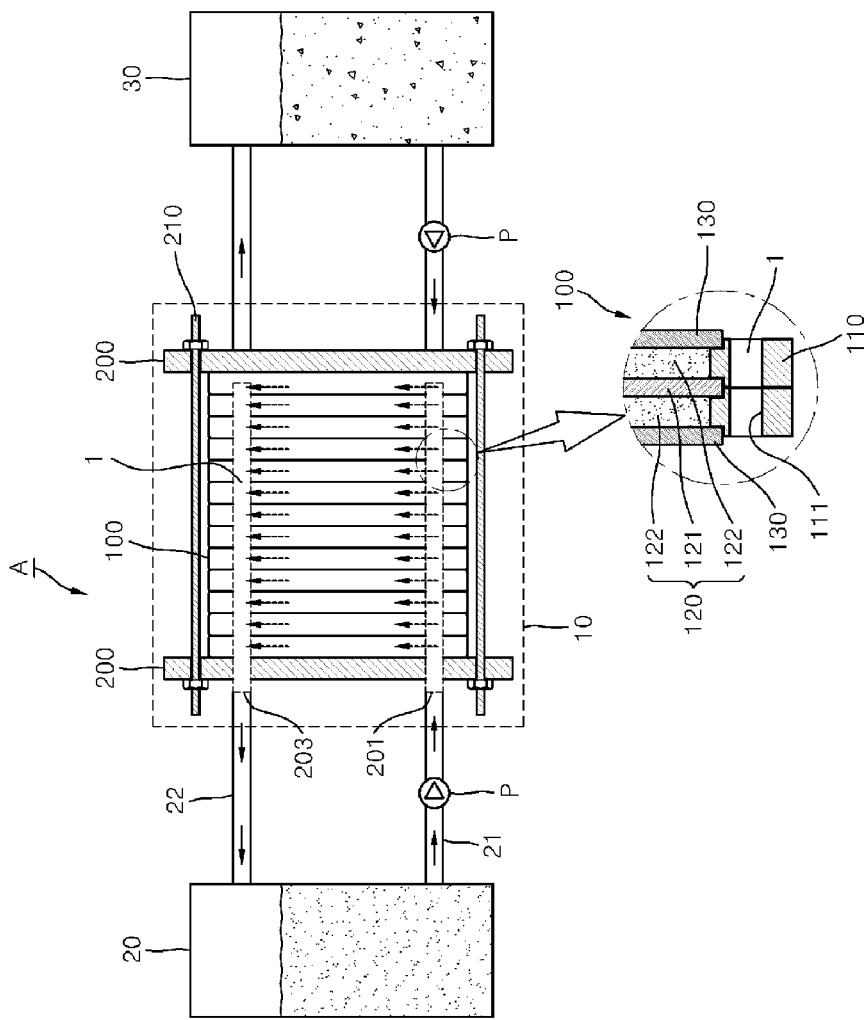
FIG. 1 is a conceptual diagram illustrating elements of a conventional REDOX flow battery.
Figure 2:
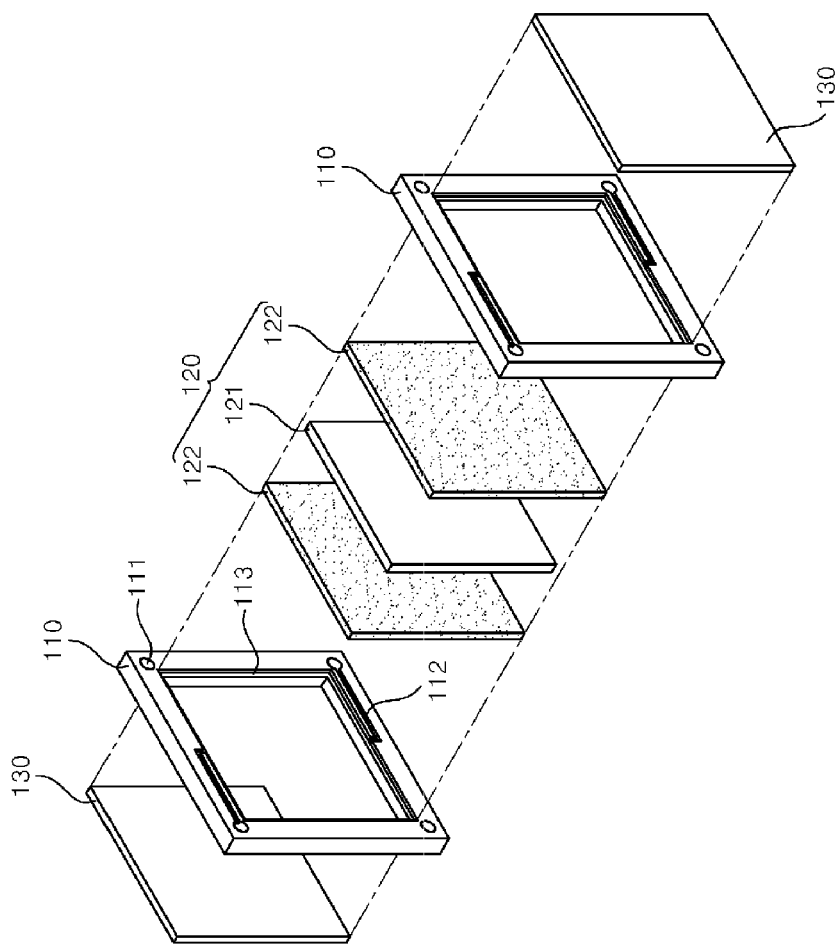
FIG. 2 is an exploded perspective view illustrating a unit cell of the conventional REDOX flow battery.

As illustrated in FIGS. 1 and 2, a conventional REDOX flow battery A includes an anode reactant storage tank 20 that stores an anode electrolyte, a cathode reactant storage tank 30 that stores a cathode electrolyte, and a stack through which the electrolytes circulate. The stack 10 is a group of unit cells 100 stacked on each other, each being a minimum element in which an electrochemical reaction occurs. The unit cell 100 includes a membrane-electrode assembly 120 and separators 130, in which the membrane-electrode assembly includes two electrodes 122 and an ion exchange membrane 121 interposed between the electrodes 122. The unit cell 100 may be provided with a frame 110 that maintains the shape of the unit cell 100 and guides the flow of a reactant. The membrane-electrode assembly 120 means a combined structure of a membrane and electrodes. It may be a structure in which a membrane and electrodes are separately prepared and then assembled with each other or a structure in which a membrane and electrodes are adhered to each other.

That is, the frame 110 is provided with one or more main channel penetration holes 111. A reactant is distributed to each unit cell 100 through an internal channel recess 112 which connects the penetration hole 111 and the membrane-electrode assembly 120. The frame is also provided with an internal channel that uniformly distributes the reactant to an electrochemical reaction area in a unit cell 100. The frame 110 is provided with a protrusion 113 that protrudes inward from an inside surface thereof. Therefore, the ion exchange membrane 121 and the separator 130 are supported on respective sides of the protrusion 113 and thus stably combined with the frame 110. Although, according to the present embodiment, the ion exchange membrane 121 and the separator 130 are combined with the frame 110 with the protrusion interposed therebetween, the ion exchange membrane 121 and the separator 130 may be stacked on each other without the protrusion 113 interposed therebetween. The separator 130 may be shared between two adjacent unit cells 100 but may not be limited thereto.

The main channel penetration holes 111 of adjacent frames 110 are arranged to form a continuous long channel. Alternatively, a reactant may be directly distributed to each of the unit cells from an outside of the stack 10. All structures in which a reactant is supplied to an inside from an outside of the stack 10 are within the same category.

Generally, a reactant is supplied to the main channel 1 formed in a stack of a unit cell through a reactant supply channel 21 that connects the anode reactant storage tank 20 to the reactant introduction hole 201 formed in the end plate 200. The reactant that passes through the membrane-electrode assembly via the internal channel moves to the main channel 1 of the next unit cell. The reactant in the main channel 1 of the next unit cell flows to the anode reactant storage tank 20 through the reactant discharge hole 203 and the reactant discharge channel 22 of the end plate 200 and is then stored in the anode reactant storage tank 20. At this point, a pump P may be connected to the reactant supply channel 21 for the purpose of circulation of the reactant. A reactant flows and circulates in the same manner in the cathode reactant storage tank 30 disposed in the opposite side of the anode reactant storage tank.

According to conventional technologies, a gasket or an O-ring is used to combine two adjacent elements (for example, a frame and a separator) to prevent leakage of a reactant. Alternatively, two adjacent elements are adhered to each other and then sealed. To maintain sealing performance, the end plates 200 are pressed to apply pressing force to the stack 10 and the end plates 200 are fixed using a fixing means. However, physical properties of the joint portion such as gasket or O-ring are deteriorated with time or the joint portion is deformed or damaged. Thus, there is a risk that the reactant leaks to an outside of the stack 10. The leaked reactant causes surrounding parts to corrode, deteriorates efficiency of the REDOX flow battery, and increases maintenance cost.

Accordingly, the present invention is to solve such leakage problems of reactants. According to the present invention, a reactant storing and collecting means for storing and collecting a reactant that is leaked is installed inside or outside a stack 10 of a REDOX flow battery A, thereby addressing leakage problems of a reactant.

The present invention features a reactant storing and collecting means for preventing leakage of a reactant provided for a REDOX flow battery A or fuel battery that includes two or more end plates 200 and a stack interposed between the end plates 200, and which is provided with one or more unit cells 100.

The stack 10 is provided with the reactant storing and collecting means for preventing leakage of a reactant. The reactant storing and collecting means may be provided inside a unit cell 100 of the stack 10 (see FIG. 3), or between the unit cell 100 of the stack 10 and a fixing means 210 of the end plate 200 (see FIG. 19), or outside the stack 10 (see FIG. 18). The position of the reactant storing and collecting means is not limited. It may be disposed at any place at which it can collect and store the leaked reactant that is present outside an electrochemical reaction area of the stack 10 at which an electrochemical reaction occurs, or outside a circulation channel of the reactant. By collecting and storing the leaked reactant, it is possible to solve problems, such as corrosion of parts, deterioration of reaction efficiency, and increase in maintenance cost of the REDOX flow battery A.

Figure 3:
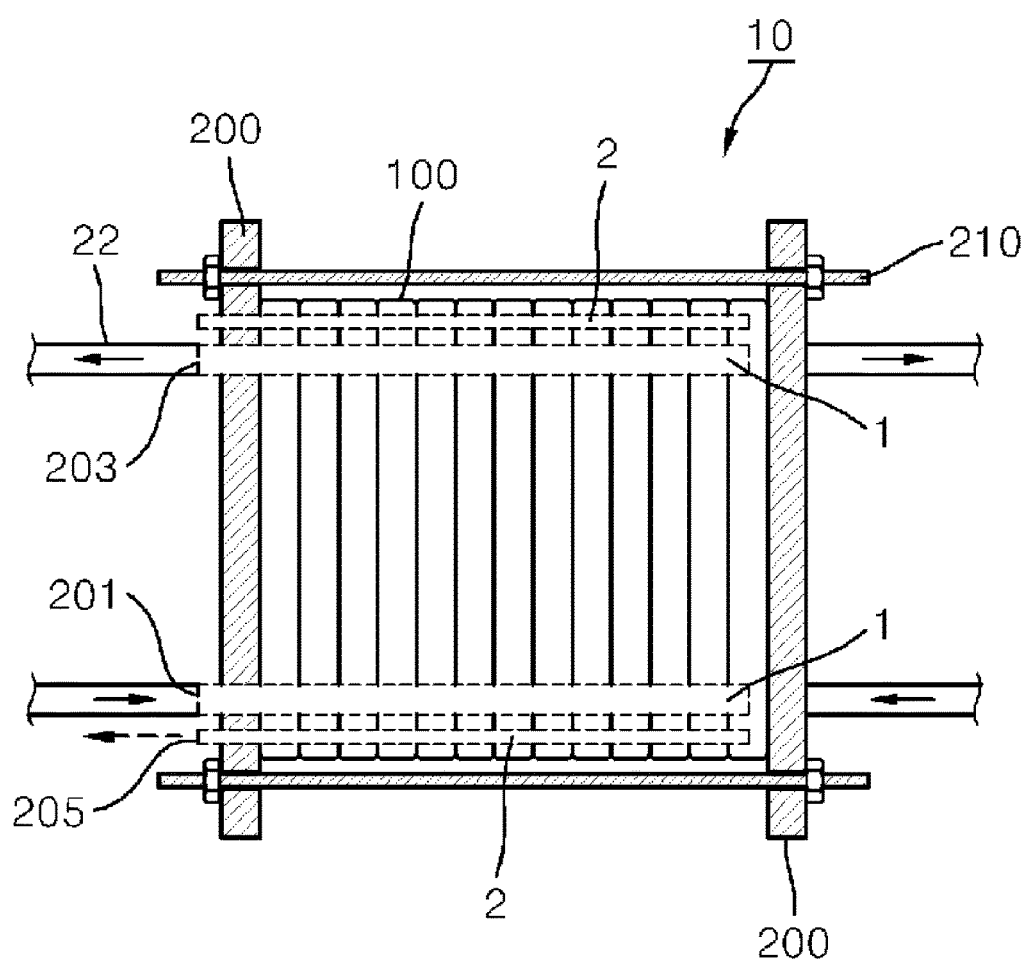
FIG. 3 is a conceptual diagram illustrating elements of a REDOX flow battery equipped with a reactant storing and collecting means in a stack, according to the present invention.

At this point, as illustrated in FIG. 3, the unit cell 100 includes two frames 110 neighboring to each other and a membrane-electrode assembly 120 and a separator 130 that are adjacent to the frames 110. FIG. 3 illustrates an example in which there are two frames 110, but the number of frames 110 is not limited to two. One frame 110 may be used or more than two frames 110 may be used as necessary.

The frame is provided with one or more main channel penetration holes 111 and an internal channel recess 112 that connects the main channel penetration holes 111 and the membrane-electrode assembly 120 to each other. The main channel penetration holes 111 form a main channel through which a reactant is supplied to the stack 10 when the two frames 110 are stacked to form a unit cell 100 and multiple unit cells 100 are staked on each other. The internal channel recess 112 forms an internal channel through which the reactant is supplied to the membrane-electrode assembly 120 from the main channel 1.

The end plate 200 is provided with one or more reactant introduction holes 201 and one or more reactant discharge holes 203. Through the reactant introduction holes 201 and the reactant discharge holes 203, the reactant (anode electrode or cathode electrode) can be supplied to the stack 10 from the reactant storage tank 20 or 30. Since reactants (anode electrode and cathode electrode) are supplied from the anode reactant storage tank 20 and the cathode reactant storage tank 30 in the REDOX flow battery A, it is preferable that there are two reactant introduction holes 201 and two reactant discharge holes 203.

In addition, in a specific example in which the reactant storing and collecting means is disposed inside the stack 10, one or more collection channel penetration portions 114 are formed outside one or more main channel penetration holes 110 in the frame 110, thereby forming a reactant collection channel 2 serving as the reactant storing and collecting means.

The collection channel penetration portions 114 formed in the frames 110 form a space when the frames 110 are stacked to constitute the stack 10. Therefore, the reactant is not leaked to an outside of the stack 10 but it is stored in the space (the reactant storage and collection channel 2) and then discharged to the outside of the stack 10 through a predetermined path. Therefore, it is preferable that the reactant storing and collecting means is disposed outside a constitutive element, i.e., outside the main channel 1 or the membrane-electrode assembly 120 so that the leaked reactant which deviates from a normal path leaks cannot leak to an outside of the stack 10. In addition, in order for the reactant which deviates from the normal path to be discharged to an outside of the stack 10, the end plate 200 is provided with a reactant collection hole 205. Therefore, the reactant can be discharged to an outside, and collected through the reactant storage and collection channel 2 and the reactant collection hole 205. Alternatively, the reactant collection hole may not be formed in the end plate 200 but be formed in the frame 110. In this case, the reactant can be recovered through an additional channel connected to the reactant collection hole. The channel may be formed using a member having the same structure as a pipe.

On the other hand, the frame may not be provided with the main channel penetration hole 111. In this case, the stack 10 is provided with a main channel 1. Even in a case in which the reactant is not supplied from an outside of the stack 19 but is stored in the stack 10, a structure in which the reactant, which leaks from the membrane-electrode assembly 120, can be collected or recovered also falls within the scope of the present invention. That is, in this case, the collection channel penetration portion 114 may be formed outside the membrane-electrode assembly 120 rather than outside the main channel penetration portion 111. In addition, according to the present invention, a recess as well as the penetration portion can be used to form the collection portion. In this case, collection channels may be formed in collection portions formed by respective recesses.

Figure 4:
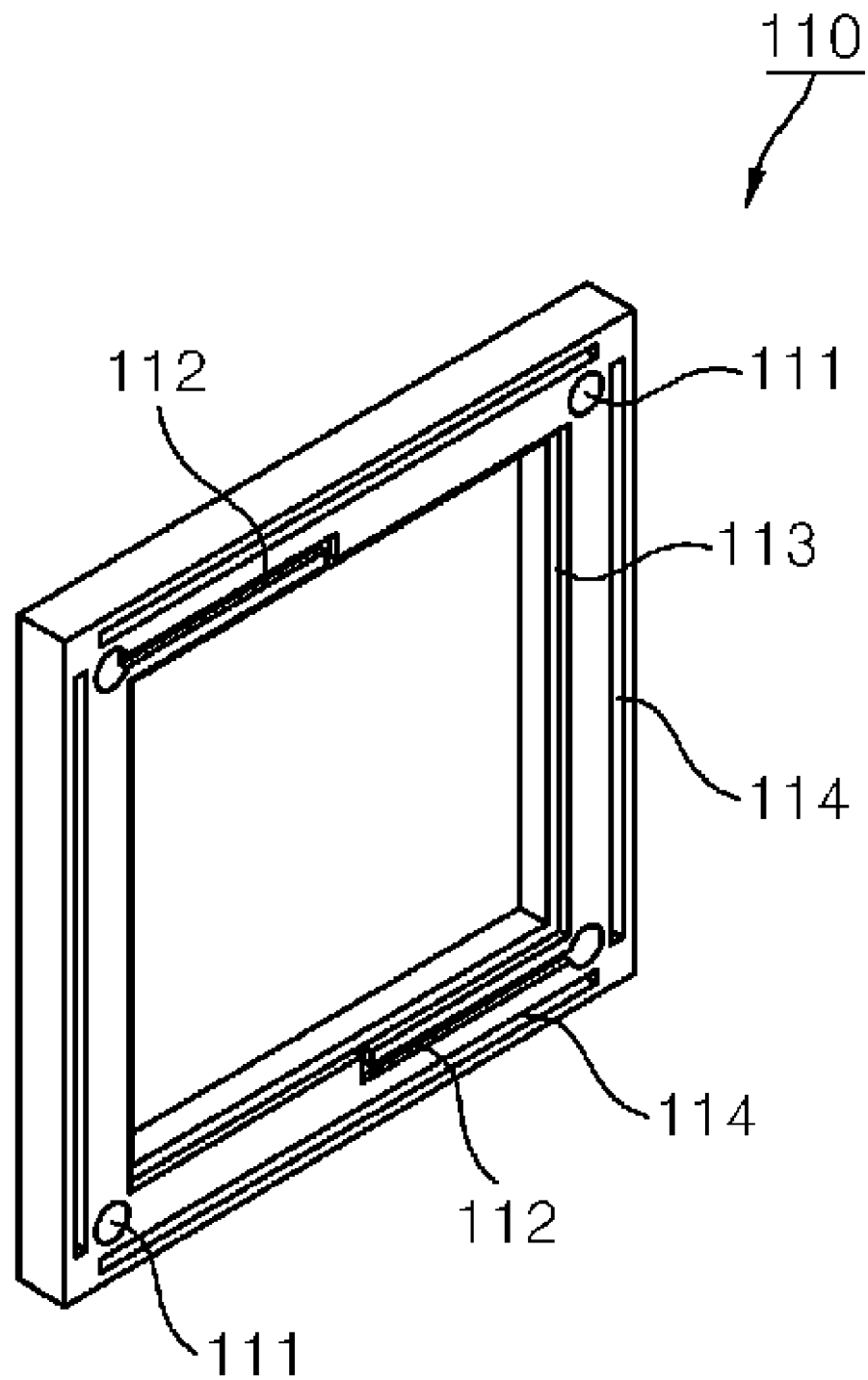
FIG. 4 is a perspective view illustrating the construction of a frame according to one embodiment of the present invention.

In the present invention, the collection channel penetration portion 114 formed in the frame 110 may take various forms, as illustrated in FIGS. 4 to 12. First, as illustrated in FIG. 4, four collection channel penetration portions 114 are formed along respective edges of the frame, specifically at positions outside the main channel penetration holes 111 of the frame. In this case, since the reactant storage and collection channel 2 is formed along almost the entire circumference of the stack 10, the reactant can be easily stored and collected.

Figure 5:
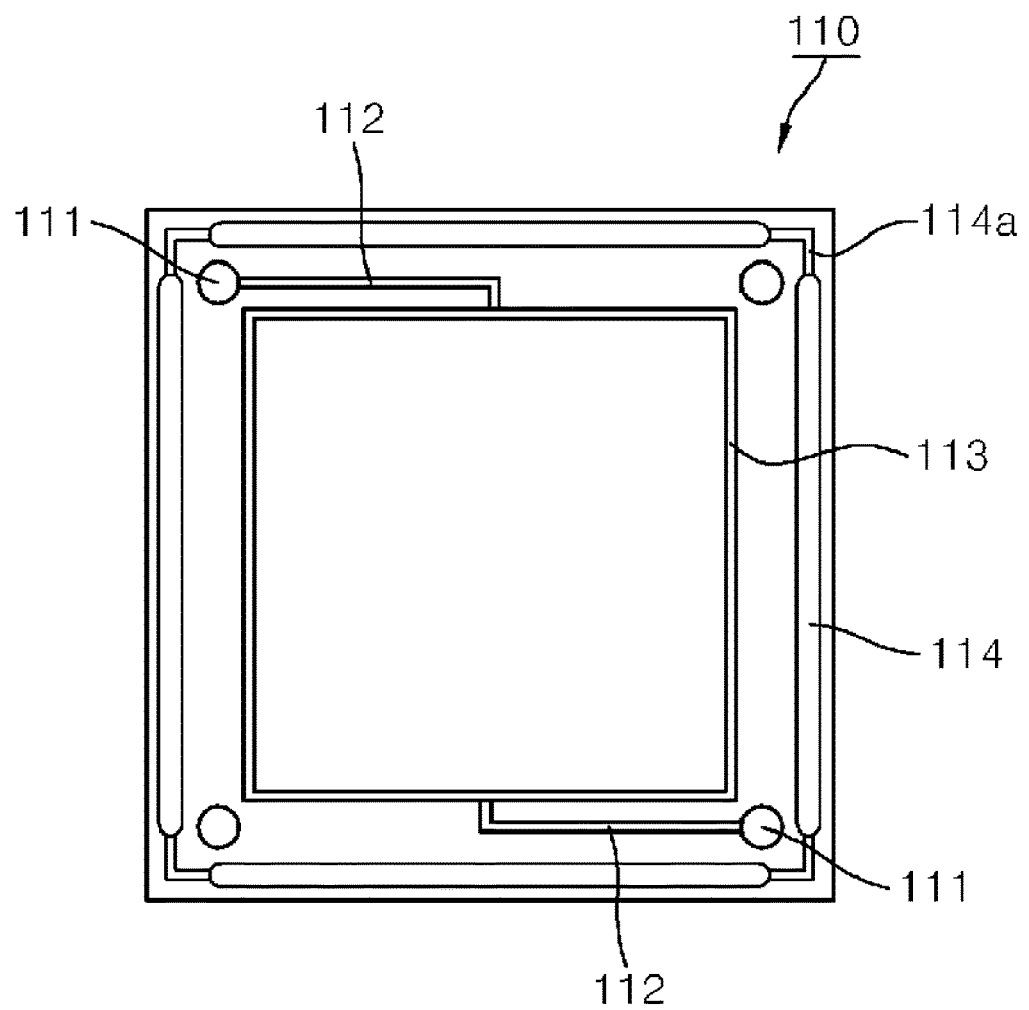
FIGS. 5 to 12 are schematic diagrams illustrating various frames according to the present invention.

In addition, as illustrated in FIG. 5, the two or more collection channel penetration holes 114 as in FIG. 4 may be connected to a collection channel recess 114a, which enables the reactant collected from the stack 10 to move to the reactant storage and collection channel 2 of the next unit cell. That is, it is possible to connect any one of the multiple storage and collection channels 2 to the reactant collection hole to collect the reactant.

Figure 6:
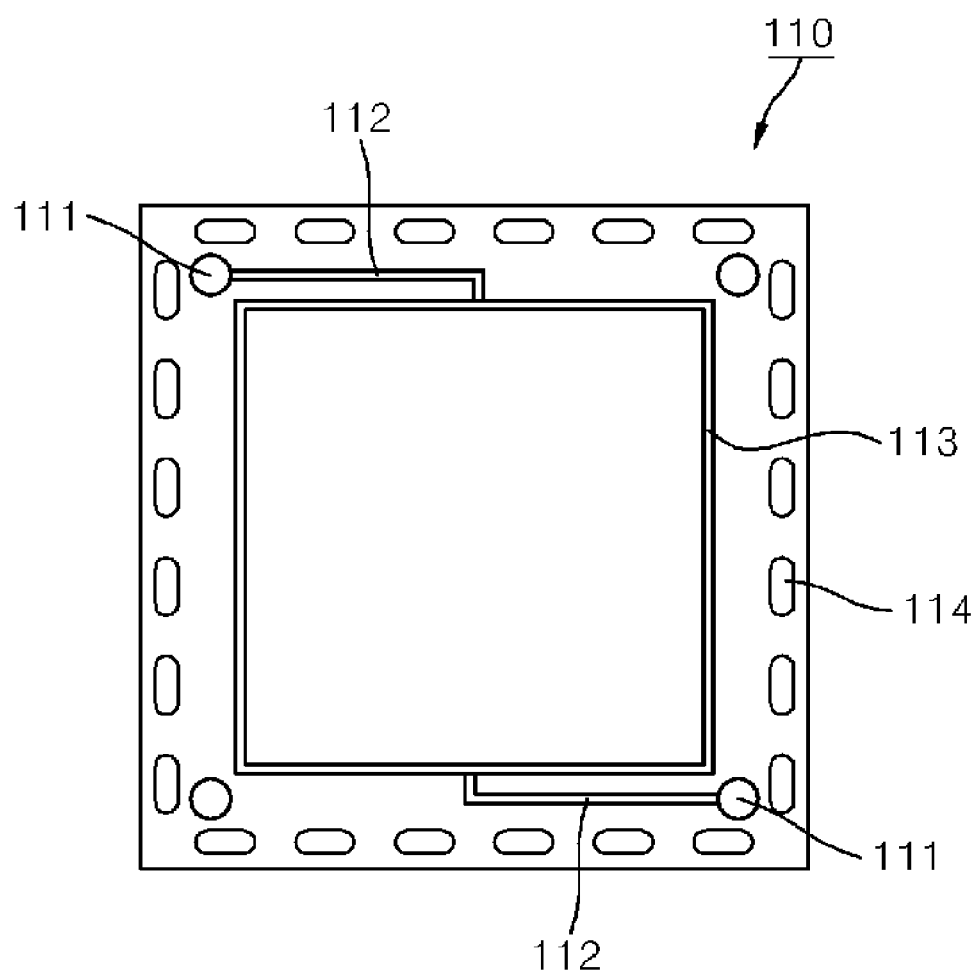

In addition, as illustrated in FIG. 6, four or more collection channel penetration holes 114 may be formed. Although not illustrated, the four or more collection channel penetration portions 114 may be connected to the collection channel recess 114a so that the reactant collected from the stack 10 can be transported to the adjacent reactant storage and collection channels 2.

Figure 7:
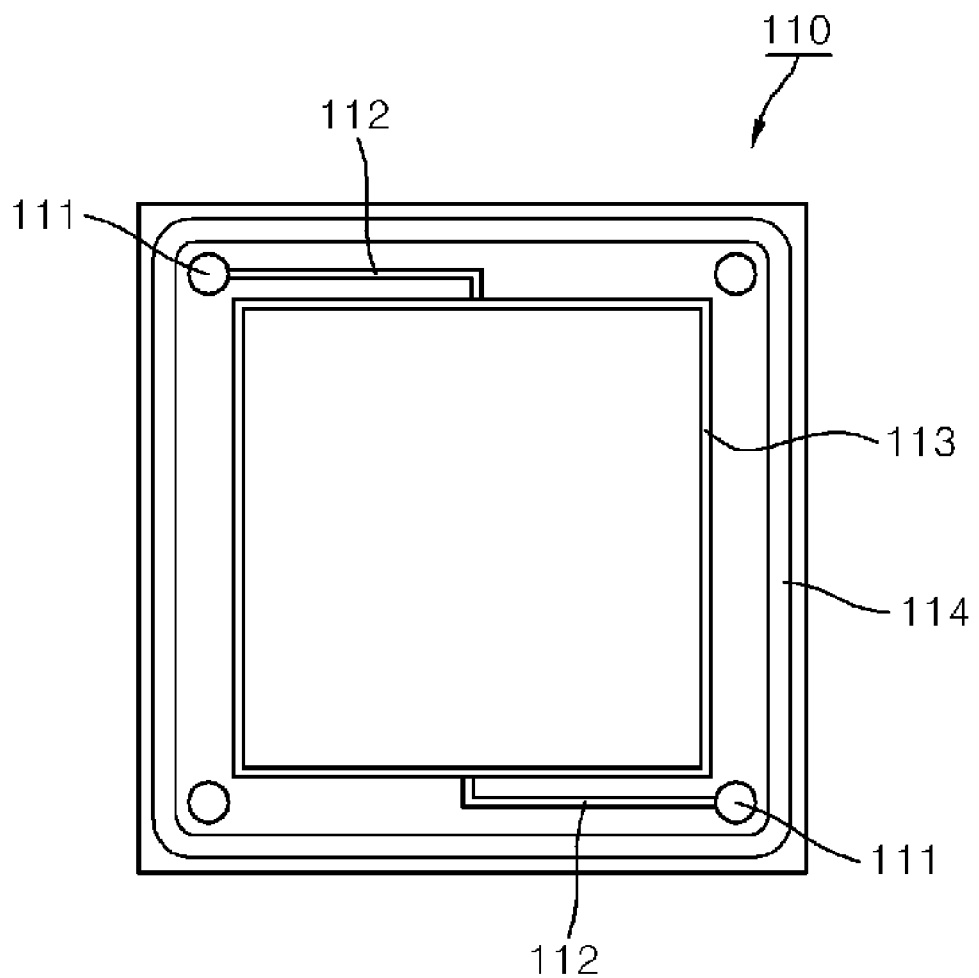
Figure 8:
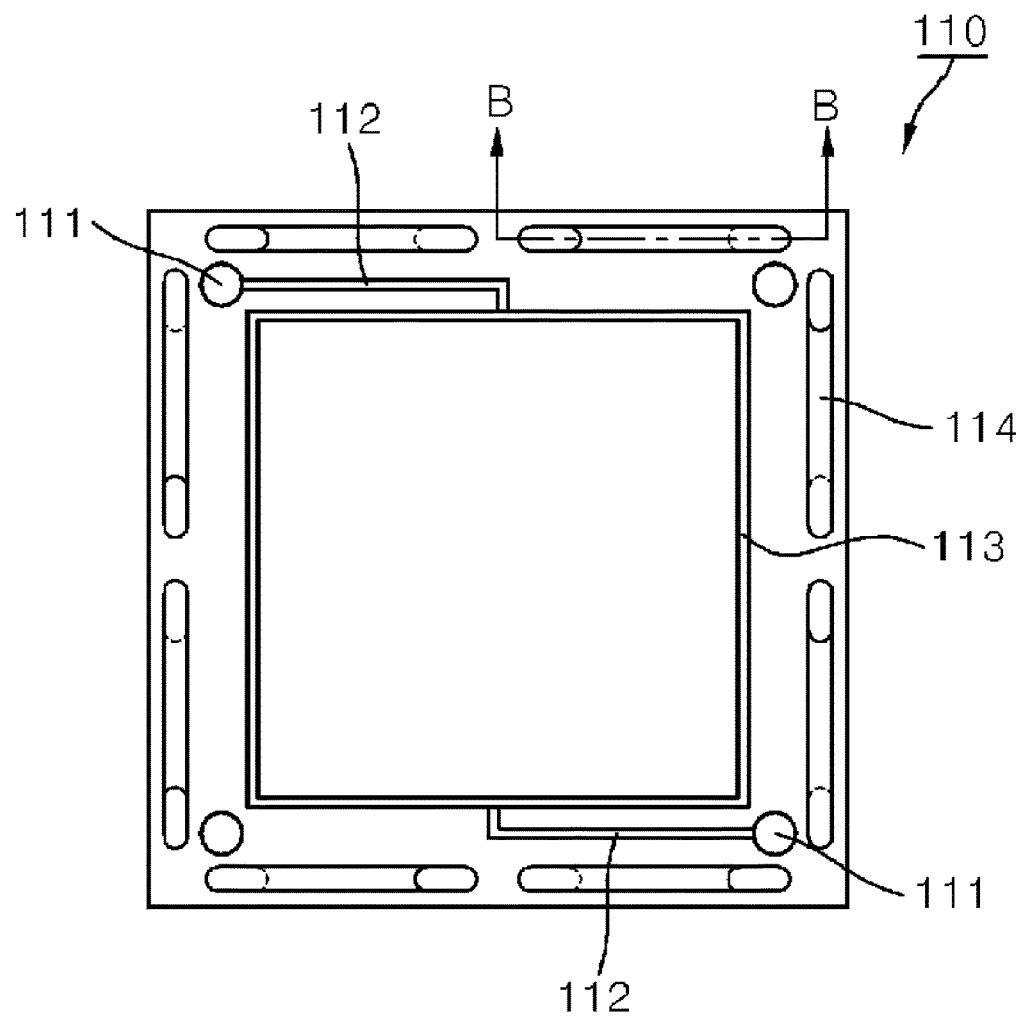
Figure 9:
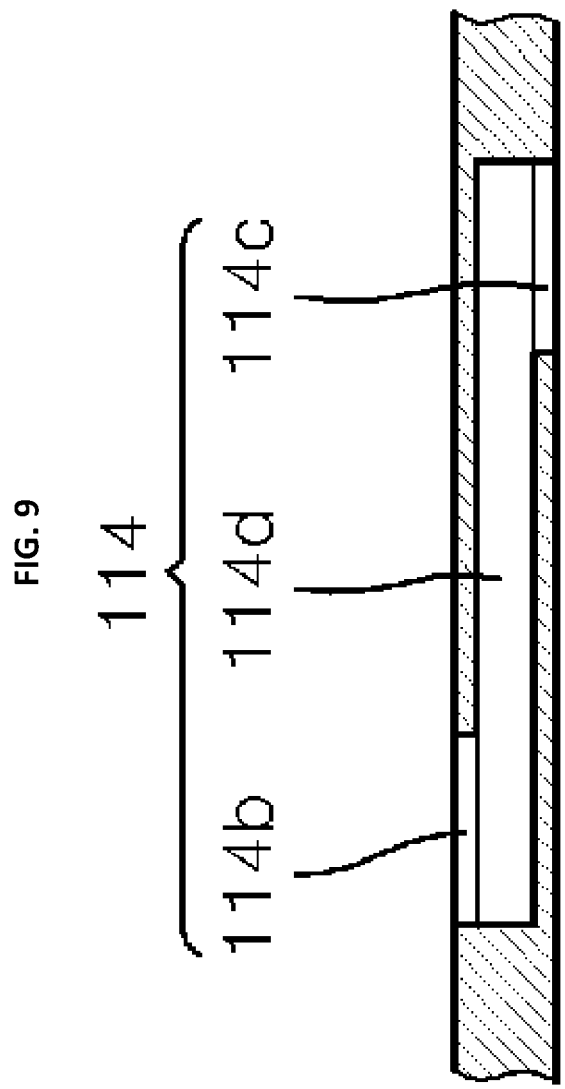
Figure 10:
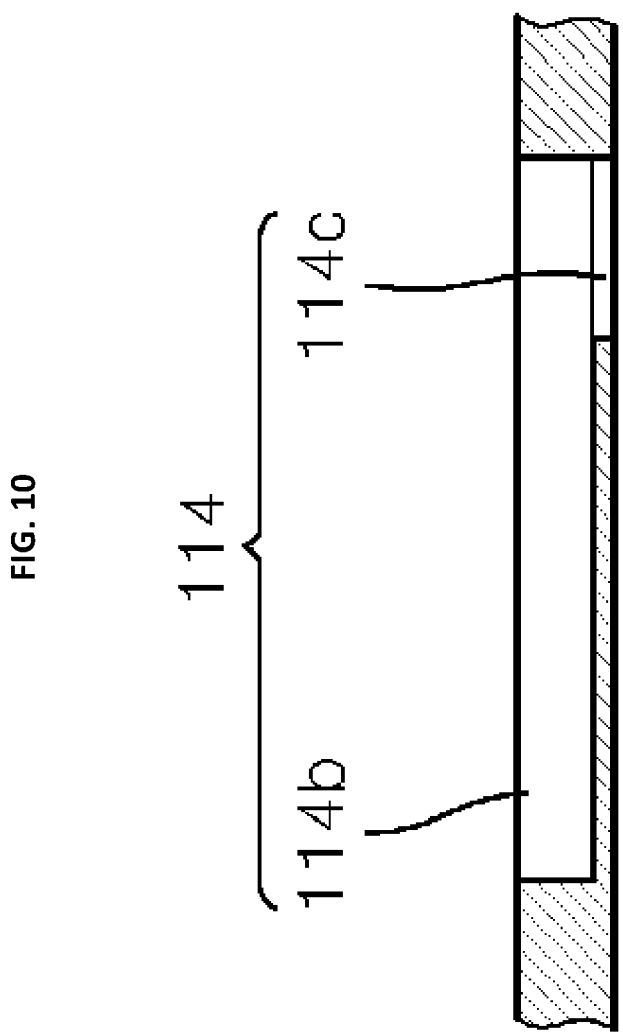
Figure 11:
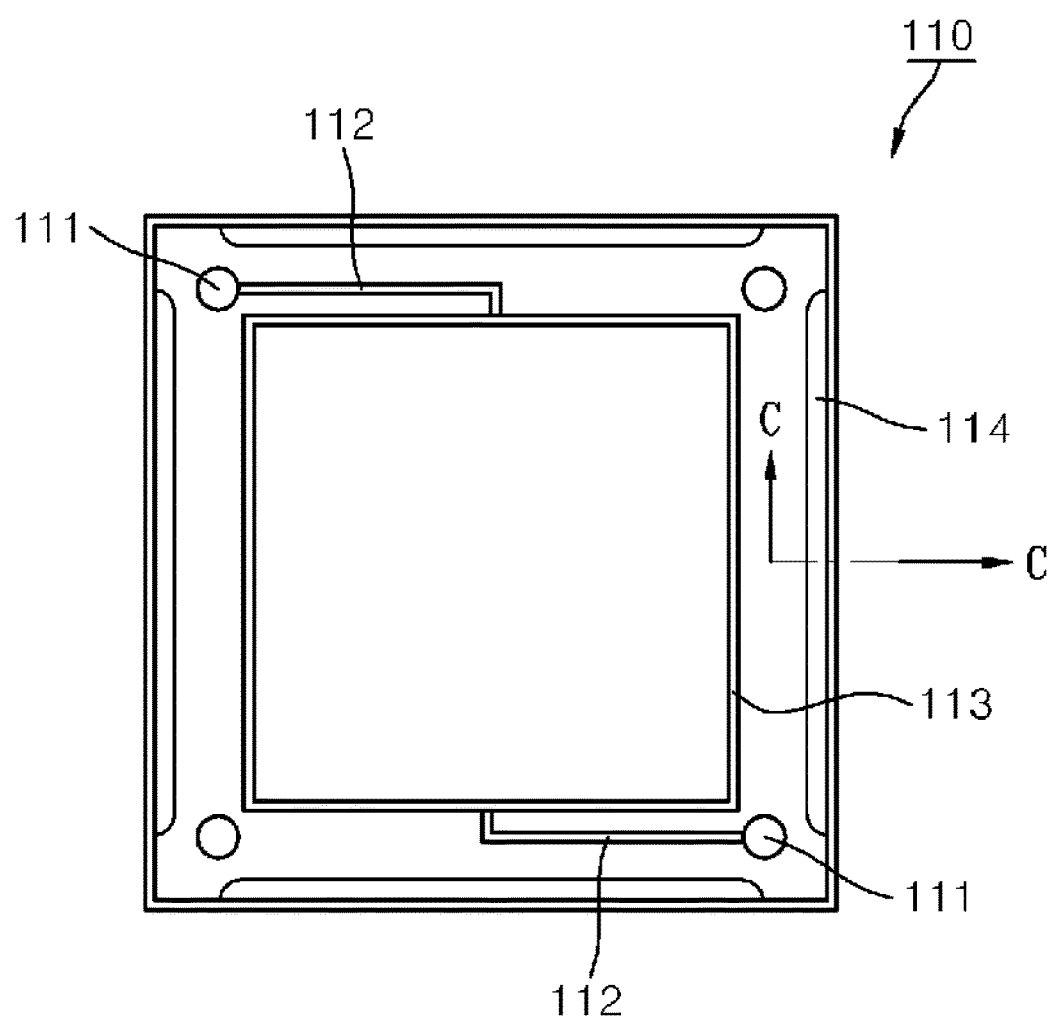
Figure 12:
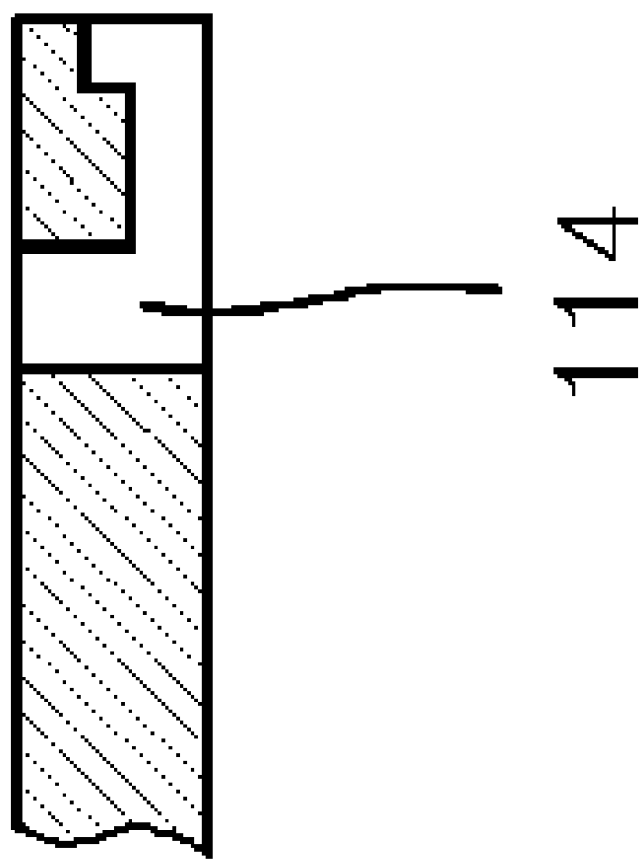

In addition, as illustrated in FIG. 7, one collection channel penetration hole 114 may be formed to extend along the entire edge of the frame 110. Alternatively, as illustrated in FIGS. 8 and 9 (cross-sectional view taken along a line B-B of FIG. 8), a front side recess 114b and a rear side recess 114c are arranged to be misaligned, and the front side recess 114b and the rear side recess 114c are connected to each other via a connection channel 114d. In this way, the collection channel penetration portion 114 can be formed. In addition, the collection channel penetration hole 114 of FIG. 10 may take the same form as that of FIG. 8 except for the fact that the front side recess 114b has a larger width than the rear side recess 114c, and the front side recess 114b and the rear side recess 114c do not overlap each other. In addition, the collection channel penetration hole 114 may not be perpendicular to the frame 110. That is, as illustrated in FIGS. 11 and 12 (cross-sectional view taken along a line C-C of FIG. 11), the cross section of the collection channel penetration hole 114 may have the letter "L" shape.

In addition, although not illustrated, the shape of the collection channel penetration hole 114 is not limited to a specific form but may be any form that enables the multiple frames 110 stacked on each other to form the reactant storage and collection channel 2.

In addition, the collection channel 2 formed in the stack 10 is connected to the reactant collection hole and the reactant collection hole is exposed to the outside of the stack 10. In this case, leakage of the reactant can be checked and verified with eyes.

In addition, an additional insertion member may be inserted in the collection channel 2. The insertion member may have an opening at one side thereof (main channel side or membrane-electrode assembly side) to collect the leaked reactant and may be sealed at the other side to prevent the reactant from leaking from a lower end portion thereof. In this case, the reactant can be collected in the outside of the stack 10 through the reactant collection hole formed in the insertion member. Since the reactant may leak between the adjacent collection channel penetration holes 114 when the reactant flows between the unit cells 100, if the insertion member is inserted into the collection channel penetration hole 114, a more stable structure can be obtained.

Figure 13:
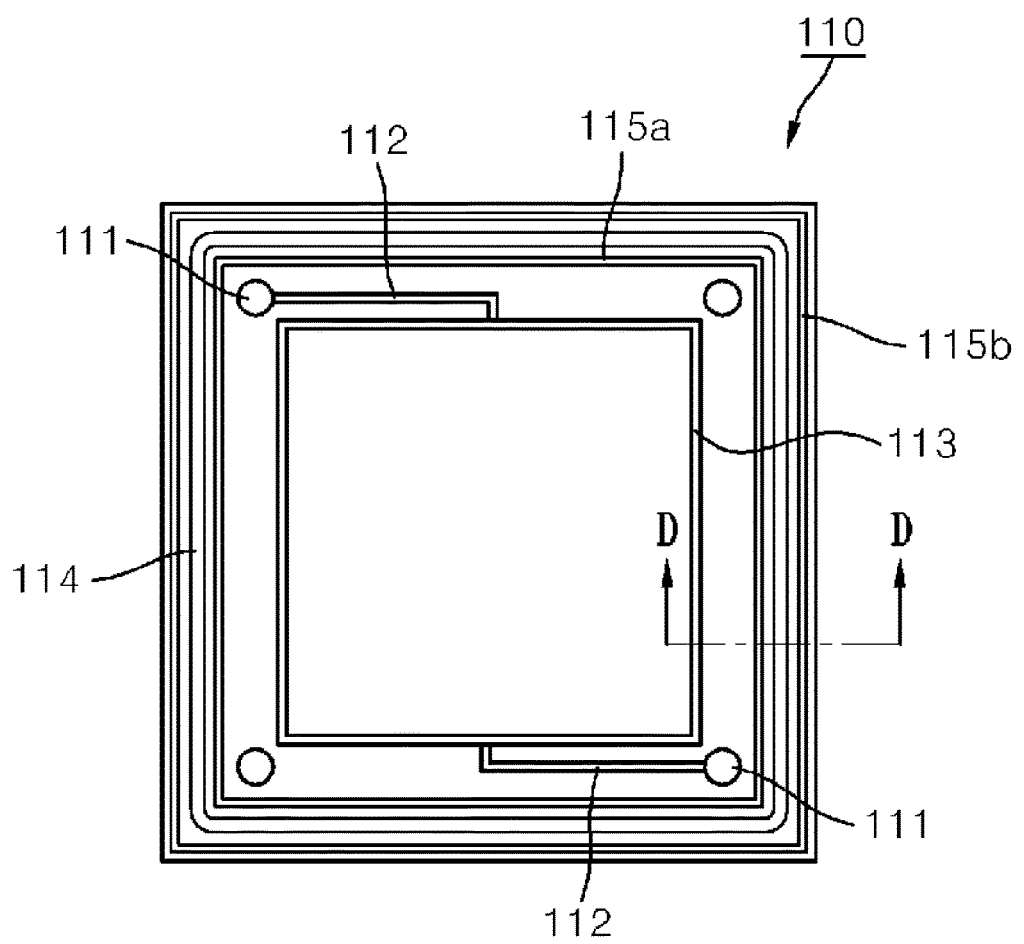
FIGS. 13 and 14 are schematic diagrams illustrating a state in which a sealing portion is provided to a frame according to the present invention.
Figure 14:
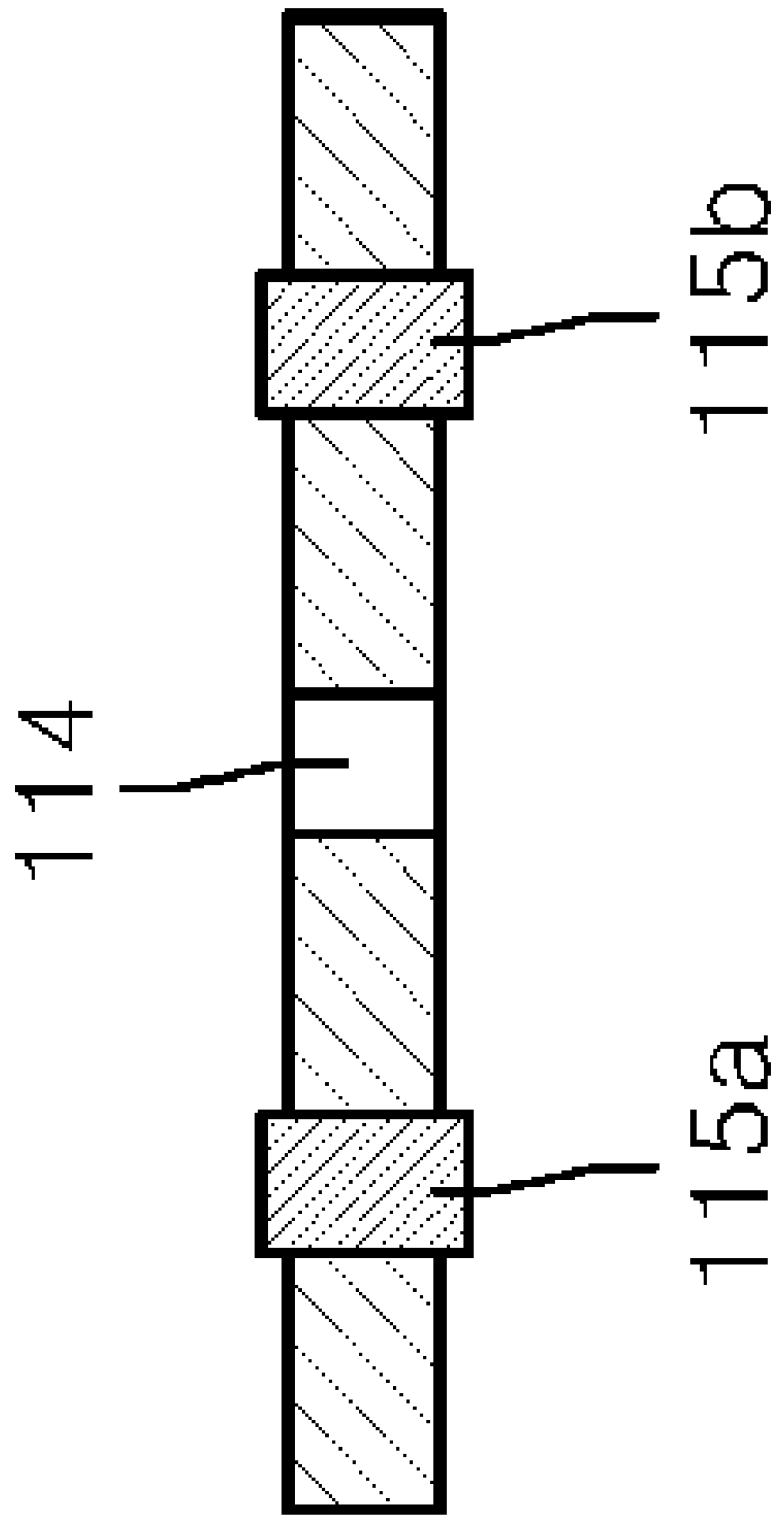

In addition, as illustrated in FIGS. 13 and 14 (cross-sectional view taken along a line D-D of FIG. 13), it is preferable that at least two sealing portions are provided at both sides of the collection channel 2 of the reactant to prevent the reactant introduced into the collection channel 2 serving as the reactant storing and collecting means from leaking and to effectively collect the leaked reactant. That is, the frame 110 is provided with a first sealing portion 115a and a second sealing portion 115b, and the collection channel penetration portion 114 is formed between the first sealing portion 115a and the second sealing portion 115b. Therefore, by using the first sealing portion 115a and the second sealing portion 115b, it is possible to prevent the reactant introduced into the reactant storage and collection channel 2 from leaking. Although only two sealing portions are illustrated in the drawing, three or more sealing portions may be provided, which more stably prevents leakage of a reactant.

The sealing portion may be an O-ring that is used in conventional REDOX flow batteries A, or a gasket. Alternatively, the sealing portion may be formed through joining. Alternatively, an additional member is not used for the sealing portion. That is, the frame 110 may be provided with a protrusion and a recess and the multiple frames may be connected in an inserted manner. In order to enhance sealing reliability, multiple sealing portions may be provided. Alternatively, various kinds of sealing portions (for example, O-ring and gasket) may be provided as the sealing portions for the same stack.

Figure 15:
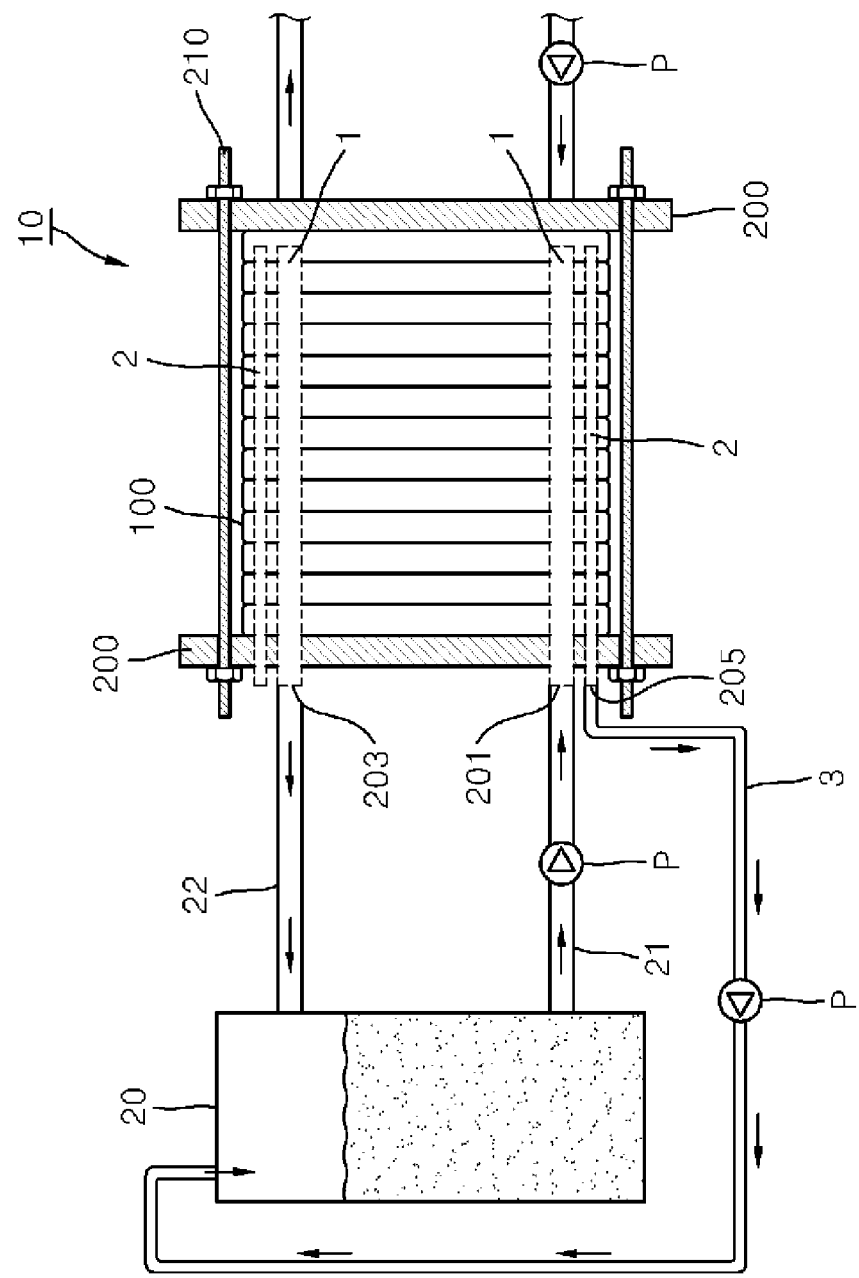
FIGS. 15 to 18 are block diagrams illustrating elements of a REDOX flow battery according to the present invention.
Figure 16:
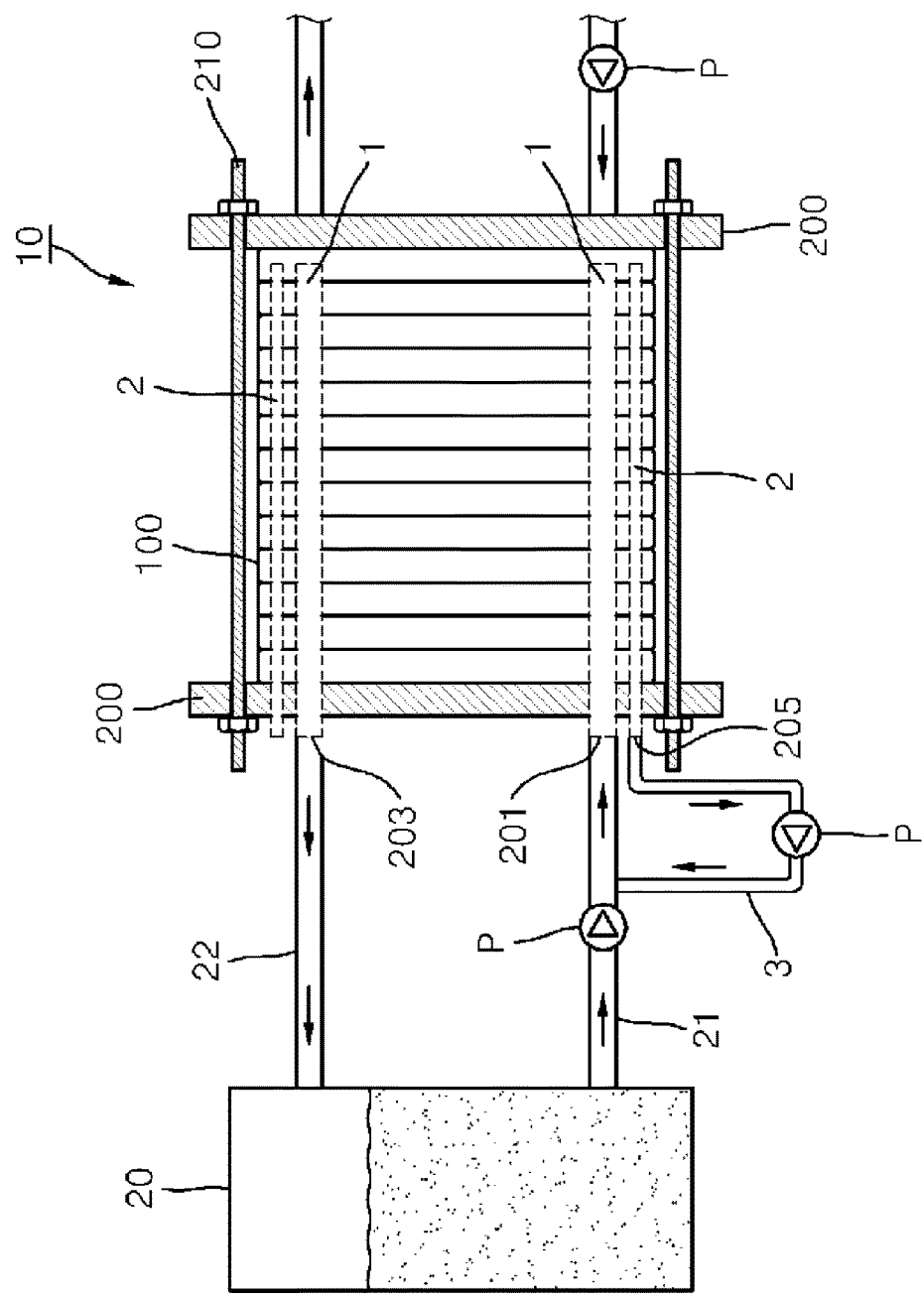
Figure 17:
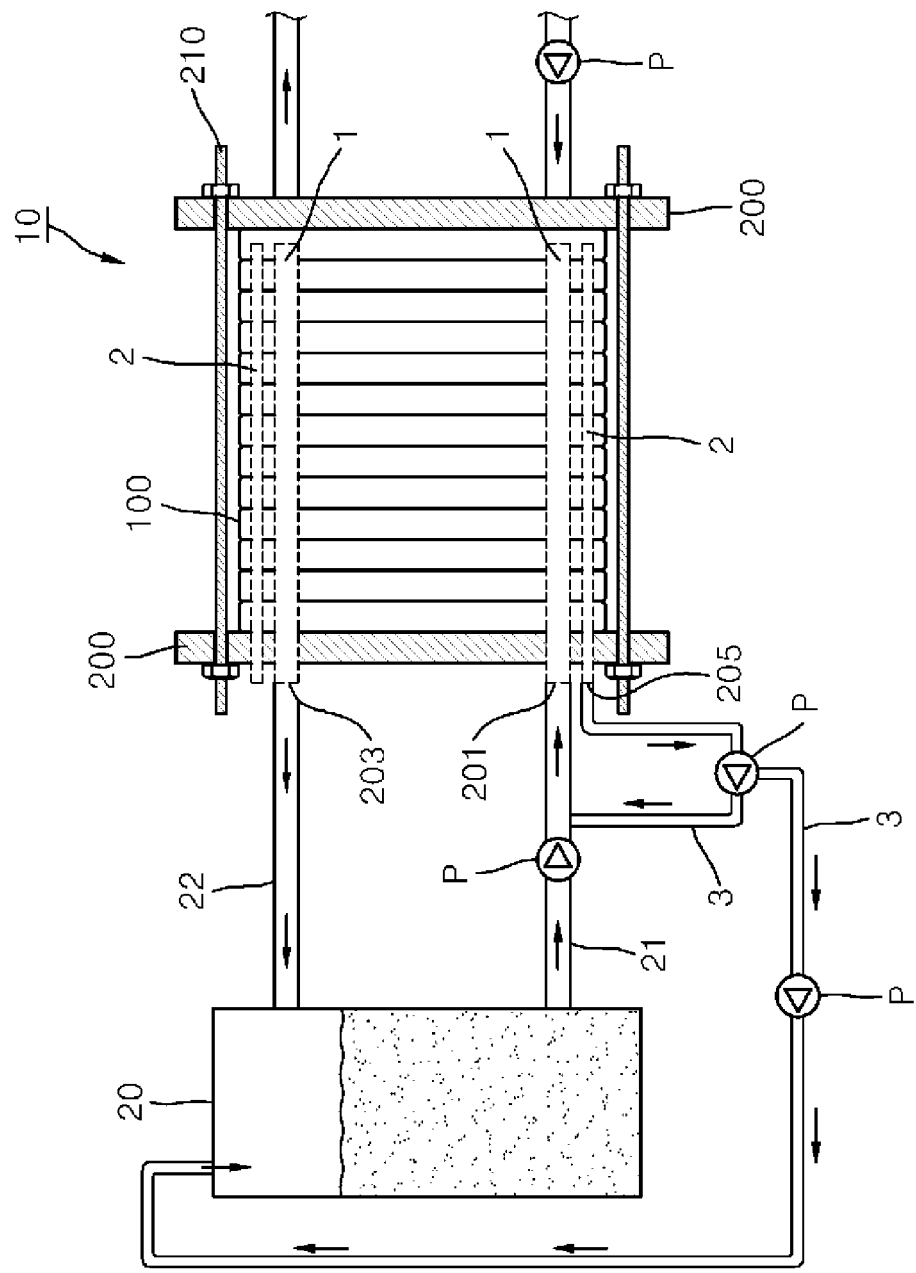

In addition, as illustrated in FIGS. 15 to 17, the REDOX flow battery A or fuel battery according to the present invention includes the reactant storage tank 20, and a reactant is supplied to the reactant introduction hole 201 formed in the end plate from the reactant storage tank 20 through the reactant supply channel 21. The supplied reactant flows through the main channel 1 formed in the stack 10 and moves to the membrane-electrode assembly 120 through the internal channel formed in the frame 110. The reactant that passes through the membrane-electrode assembly 120 flows back go the main channel through the internal channel, and is discharged through the reactant discharge hole 203 formed in the end plate 200. It is then recovered to the reactant storage tank 20 through the reactant collection channel 22.

The reactant introduction hole 201 and the reactant collection hole 203 may not be formed in the end plate 200 but be formed in the frame 110 or the membrane-electrode assembly 120. The reactant introduction hole 201 and the reactant collection hole 203 may not be limited to a specific form.

The reactant that is present outside the main channel 1 or the membrane-electrode assembly 120, i.e., the reactant that is present outside a reaction space in which an electrochemical reaction occurs or is present in a circulation channel of the reactant is recovered to the collection channel 2 and discharged to the outside of the stack 10 through the reactant discharge hole 205. The reactant discharge hole 205 is connected to the connection channel 3 and the collected reactant can be supplied to any one or two of the reactant storage tank 20, the reactant supply channel 21, and the reactant discharge channel 22 through the connection channel 3. Therefore, the collected reactant can be reused. The reactant may not be supplied to the reactant storage tank 20, the reactant supply channel 21, or the reactant discharge channel but be directly discharged in some situations. Alternatively, the reactant may be stored in an additional tank.

Here, if discharging of the reactant introduced into the reactant collection channel 2 is not performed, the internal pressure of the collection channel 2 rises, which causes the reactant to leak outside from the stack 10. Therefore, the reactant is made to be discharged outside the stack 10 through the connection channel 3. To facilitate the discharging of the reactant, a pump P may be installed on the connection channel 3.

In addition, in accordance with the form the reactant storing and collecting means, i.e. the form and the number of the collection channel penetration portions 114, there may be multiple reactant discharge holes 205 and multiple connection channels 3. When there are two or more reactant discharge holes 205 and two or more connection channels 3, a pressure is applied to some of the reactant discharge holes 205 or the connection channels 3 to facilitate discharging of the collected and stored reactant. Alternatively, a porous material is inserted into some of the reactant discharge holes 205 or the connection channels 3 to absorb the reactant in the reactant discharge holes 205 and the connection channels 3, thereby facilitating discharging of the reactant.

Figure 18:
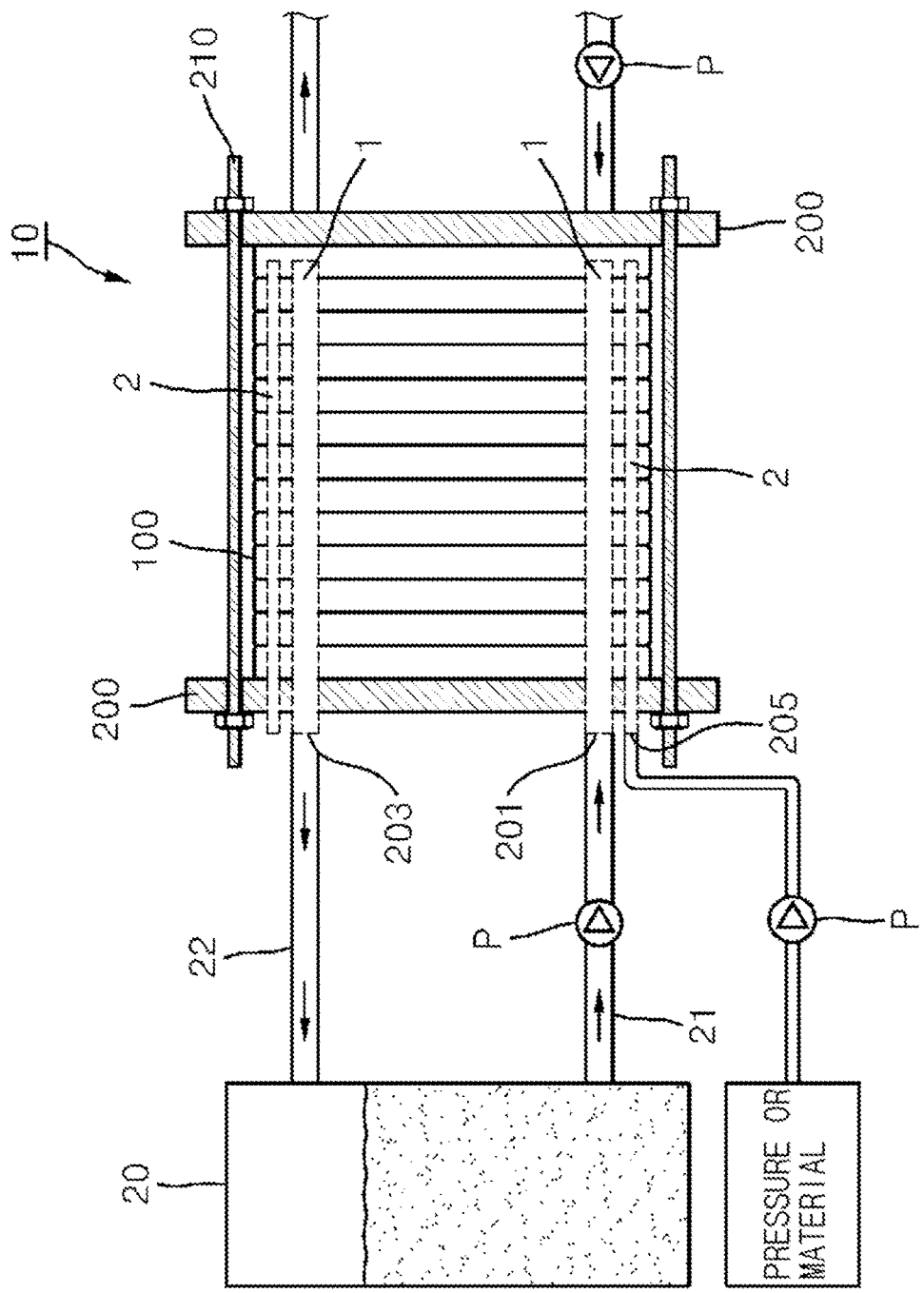

Generally, leakage of the reactant occurs when the internal pressure of the stack 10 is higher than the external pressure of the stack. When a pressure that is equal to or higher than the pressure in the main channel 1 or the electrochemical reaction space (membrane-electrode assembly) is applied to the main channel 1, the reactant does not leak to the outside of the stack 10. Accordingly, as illustrated in FIG. 18, according to the present invention, it is possible to prevent the reactant from leaking to the outside of the main channel 1, the internal channel, and the electrochemical reaction space by applying air pressure or fluid pressure to the collection channel 2 that is a space formed in the stack.

For the same purpose, a material such as an adhesive or a hardening agent is injected into the collection channel 2 so that the collection channel 2 can be filled with the material. This is also a way of preventing leakage of the reactant. In order to effectively fill the collection channel 2 with the material, multiple reactant discharge holes 205 connected to the collection channel 2 may be provided, the material is injected into the reactant discharge holes 205 using a pressurizing means, and a different reactant discharge hole 205 is opened so that the reactant flows outside when a predetermined portion of the collection channel 2 is filled with the material. In this way, it is possible to ensure that the collection channel 2 remains full.

By filling the collection channel 2 with a porous material, it is possible to prevent the internal pressure of the collection channel 2 of the reactant from excessively rising. In addition, a stable leakage-preventing structure is formed because the porous material absorbs the leaked reactant for a predetermined period of time.

In the embodiments that have been described above, when the REDOX battery or fuel battery is provided with the reactant storing and collecting means within the stack 10, only the frame 110 is provided with the penetration holes 114 and the collection channel 2. However, if the frame 110 has a size similar to that of the ion exchange membrane 121 and the separator 130, the ion exchange membrane 121 and the separator 130 may also be provided with the penetration holes 114. In this case, the collection channel 2 is formed in all of the frame 110, the ion exchange membrane 121, and the separator 130, so that the leaked reactant can be collected by and stored in the collection channel 2.

In addition, any structure in which a predetermined space or channel is formed at a position that is not in a space in which an electrochemical reaction occurs (space in which a porous electrode is disposed, a reactant flows, and an electrochemical reaction occurs) or that is in the internal channel or the main channel connected to the space, is construed to be the reactant storing and collecting means according to the present invention. The expression "the reactant is discharged to an outside of the stack 10 from the reactant storing and collecting means" means that the reactant flows along a predetermined path (such as the main channel 1) under control, with aid of a predetermined device such as a pump, or gravity, or internal pressure of the collection channel.

In addition, while the stack 10 of a conventional REDOX flow battery A includes four electrolyte introduction/discharge holes including an anode electrolyte introduction hole, an anode electrolyte discharge hole, a cathode electrolyte introduction hole, and a cathode electrolyte discharge hole, a structure in which at least one additional introduction/discharge hole through which an electrolyte or a certain material can be introduced and discharged is provided aside from the four electrolyte introduction/discharge holes. Such a configuration should be construed to fall within the scope of the present invention.

Figure 19:
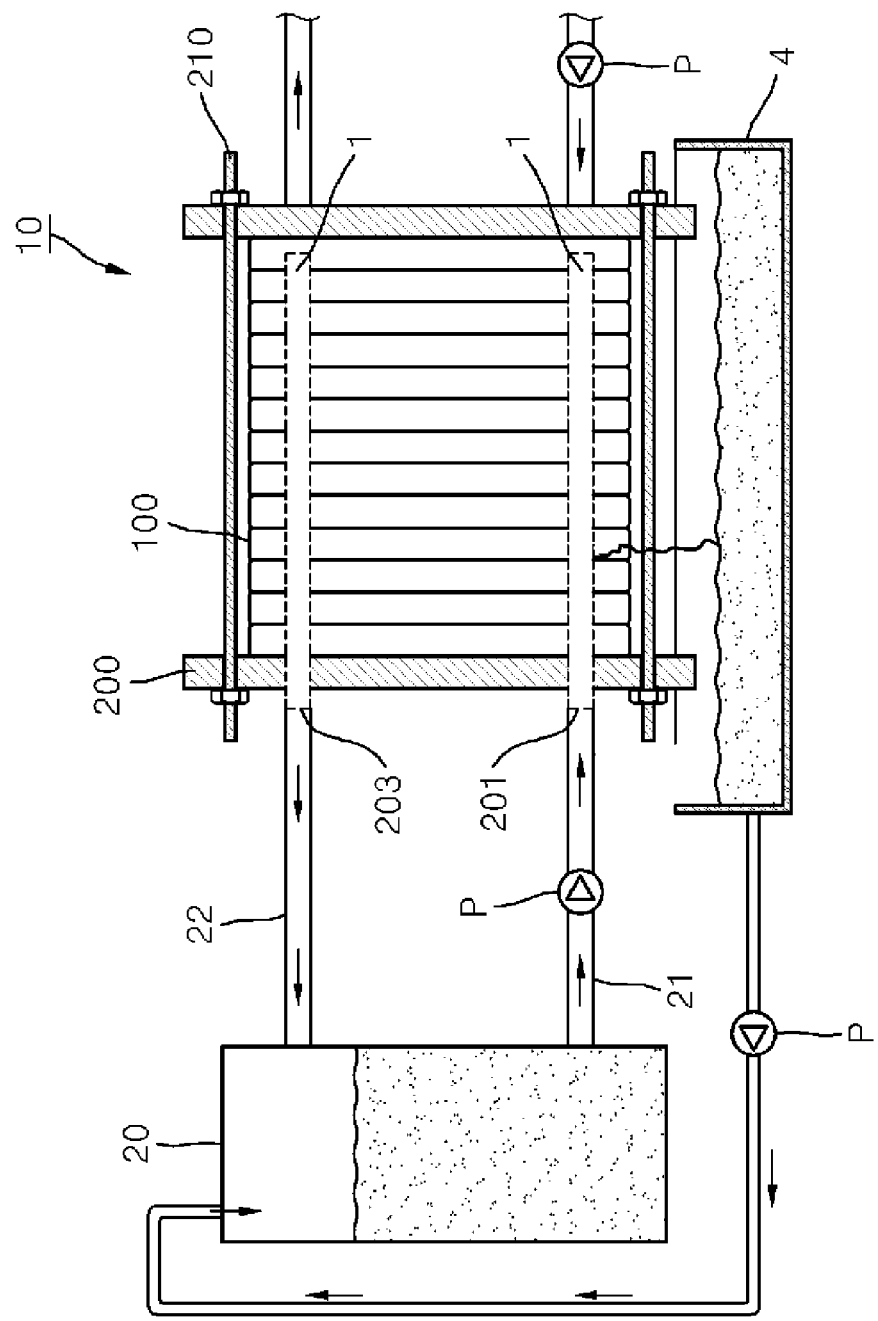
FIGS. 19 and 20 are block diagrams illustrating a structure in which a reactant storing and collecting means is installed outside a unit cell of the REDOX flow battery according to the present invention.
Figure 20:
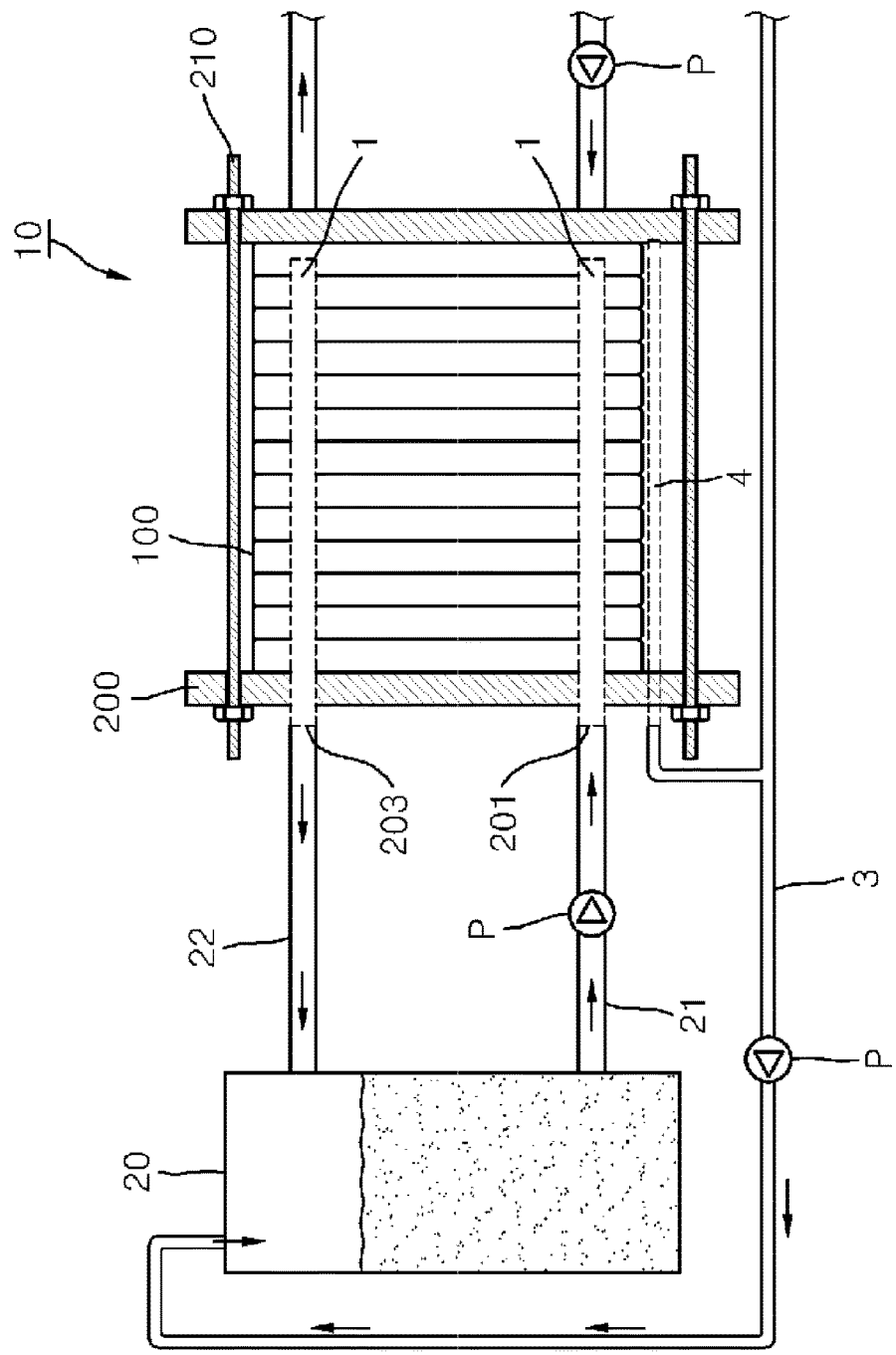

On the other hand, as illustrated in FIGS. 19 and 20, the reactant storing and collecting means may not be disposed in the stack 10, i.e., in the unit cell 100 but may be disposed outside the stack 10 or the unit cell 100 in the stack 10.

That is, since there is a risk that the leaked reactant flows in a gravitational direction after it is discharged to the outside of the stack 10, a reactant collector 4 serving as the reactant storing and collecting means may be provided under the stack 10 to prevent the leaked reactant from coming into contact with other parts of the stack 10, as illustrated in FIG. 19. In this case, an upper portion of the reactant collector 4 is open as illustrated in the drawing. When the storing and collecting means is provided outside the stack 10, a REDOX flow battery or fuel battery comprising a storing and collecting means may not be newly manufactured but rather a reactant storing and collecting means is just added to a conventional stack 10 to form a REDOX flow battery or fuel battery comprising a storing and collecting means according to the present invention. Accordingly, since the present invention is implemented by improving an existing REDOX flow battery A, it is possible to provide a stable structure and to reduce maintenance cost.

In addition, as illustrated in FIG. 20, an additional reactant storing and collecting means may be provided to an inside of a connection unit of the end plate 200 or to a lower portion of the unit cell 100. In this case, as the reactant storing and collecting means, a reactant collector 4 that is open at an upper end thereof may be used.

Although the storing and collecting means for an electrolyte is provided at a lower portion of the stack 10 in consideration of the gravitational direction as illustrated in FIGS. 19 and 20, the present invention is not limited thereto. The storing and collecting means may be provided to almost the entire outer surface of the stack 10 or to around an external channel through which the reactant flows.

When the storing and collecting means for a reactant is provided outside the stack 10, the outer surface of the stack 10 is surrounded by a sealed case. In this way, it is possible to collect the leaked reactant using the case. In addition, by applying a pressure to an inside of the case so that the external pressure can be higher than the internal pressure of the stack 10, it is possible to prevent leakage of the reactant. The expression "outside the stack 10" means "outside the membrane-electrode assembly 120 or outside the separator 130. The reactant storing and collecting means may be combined with a portion of the stack or separated from the stack 10.

The reactant storing and collecting means 4 may be installed inside or outside the stack 10 or installed both inside and outside the stack 10. That is, multiple reactant storing and collecting means may be provided and its application is not limited.

Figure 21:
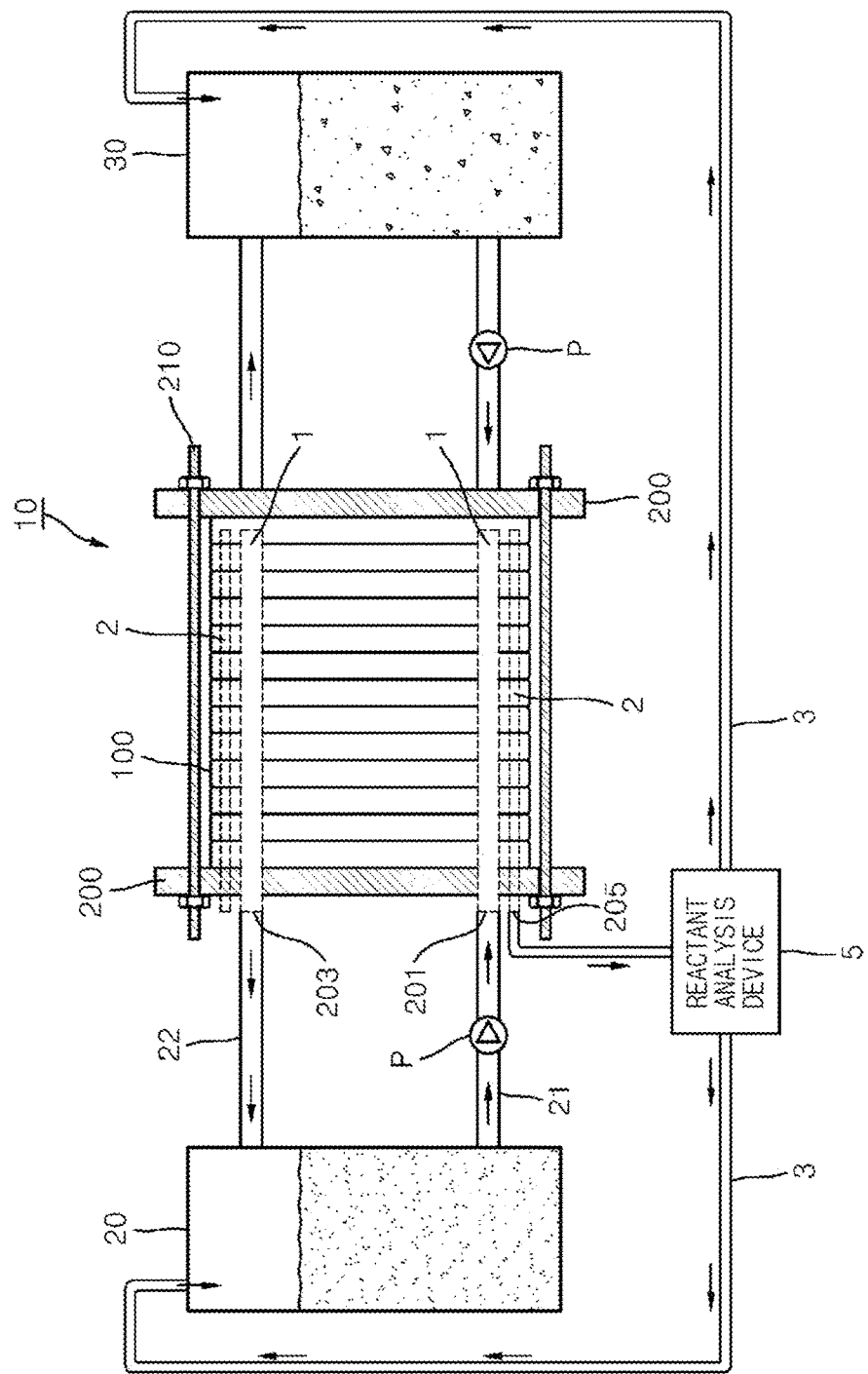
FIG. 21 is a diagram illustrating a structure in which the REDOX flow battery according to the present invention is provided with a reactant analysis device.

The REDOX flow battery A uses two kinds of reactants (anode electrolyte and cathode electrolyte). The leaked reactant may be an anode electrolyte or a cathode electrolyte. Accordingly, it is necessary to verify the kind of the collected reactant. Therefore, a reactant analysis device 5 may be used as illustrated in FIG. 21.

Since an anode electrolyte and a cathode electrolyte generally flow in the stack 10, it is difficult to determine which electrolyte is leaked. Therefore, according to the present invention, by analyzing the leaked reactant (oxidation state of the reactant), the leaked reactant is selectively supplemented to the reactant storage tank 20. The leaked reactant is collected and stored in the manner described above, and its oxidation state is analyzed by the reactant analysis device 5. According to the analyzed oxidation state, the reactant is supplied to the reactant storage tank 20 or 30, or the reactant is supplied to the reactant supply channel 21 or the reactant discharge channel 22. Alternatively, the reactant may be discharged outside.

In the case of the REDOX flow battery A, if the oxidation state of the electrolyte changes, electrical charges are charged or discharged. Accordingly, according to the embodiment of the present invention, a device that detects a change in oxidation state is used as the reactant analysis device. However, a composition analyzer, commonly used in the field of REDOX flow batteries or fuel batteries to which the present invention is applied, may be used instead of the oxidation state analyzer.

Figure 22:
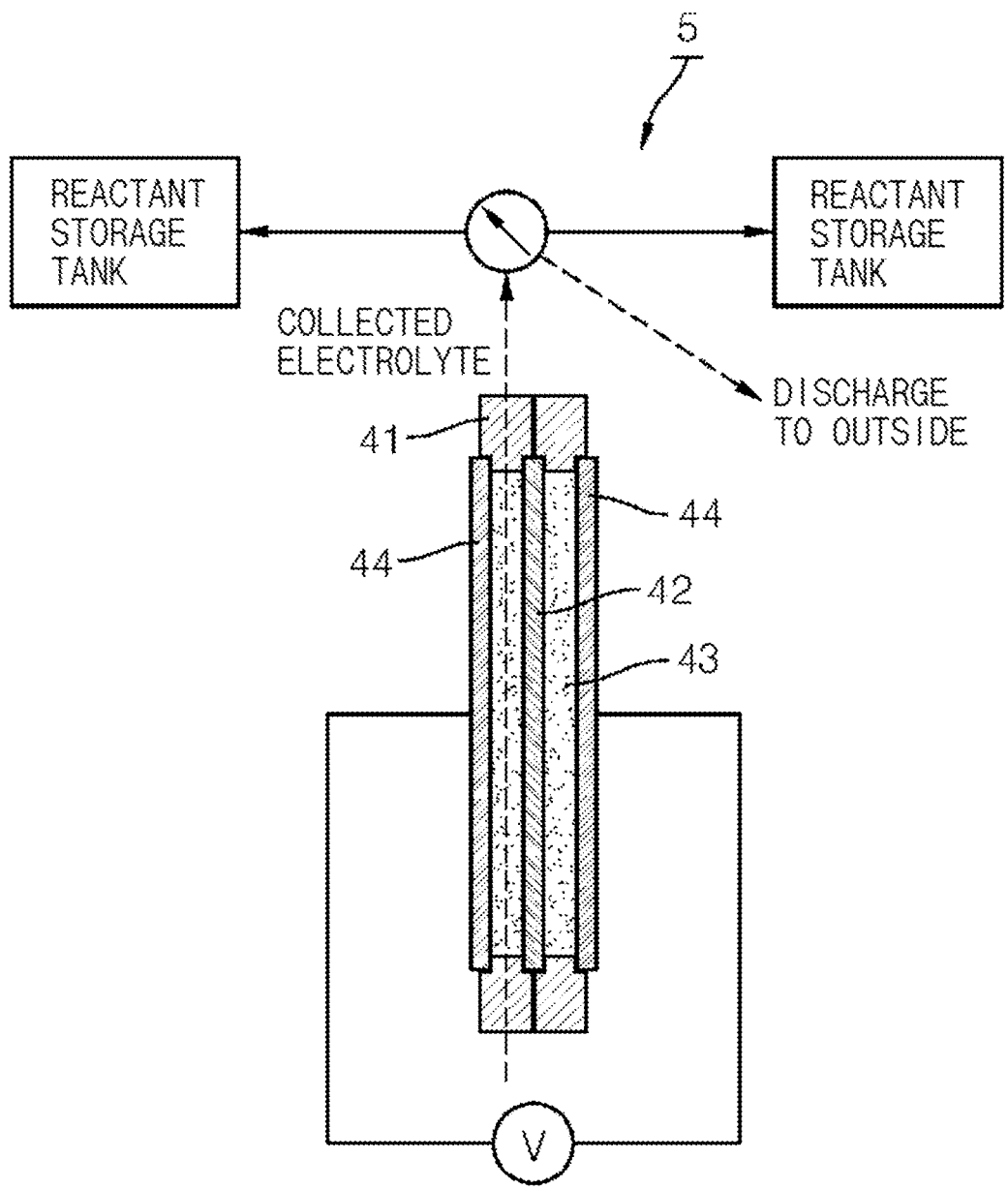
FIG. 22 is a block diagram illustrating the reactant analysis device according to the present invention.

As an example, as illustrated in FIG. 22, a reactant analysis device 5 for determining oxidation state includes an ion exchange membrane 42, an electrode 43, a pair of separators 44, and a pair of frames 41 like the unit cell 100 of FIG. 1. One electrode of the cell 100 is filled with an electrolyte whose oxidation state is known, and the other electrode is filled with the leaked electrolyte whose oxidation state is unknown. When the oxidation numbers of the two electrolytes are different, a predetermined electromotive force is generated. Then, it is possible to analyze the oxidation state of the electrolyte using the electromagnetic force. Thus, the electrolyte whose oxidation state is verified is selectively supplied to the reactant storage tank 20 or 30. In addition, a predetermined voltage V is applied to a cell for the purpose of determination of oxidation state, an electrochemical reaction occurs as in the stack 10. Accordingly, the oxidation state of the leaked electrolyte is adjusted, and is supplemented to the reactant storage tank 20 or 30. The reactant analyzed by the reactant analysis device 5 is retreated and is then supplied to the reactant storage tank 20 or 30, the reactant supply channel 21, or the reactant discharge channel 22, or is discharged to the outside.

In addition, after checking the level of the reactant storage tank 20 or 30, when the reactant is insufficient, the reactant storage tank 20 or 30 is replenished with the reactant.

As described above, since the leaked electrolyte is analyzed, the level of the reactant storage tank 20 or 30 is checked, and the reactant tank 20 or 30 is replenished as necessary, when an electrolyte balance is disrupted due to the leaked electrolyte, thereby the electrolyte is adjusted to be balanced. The reactant analysis device 5, which is an additional device, is preferably disposed outside the stack 10, but it may be disposed inside the stack 10. That is, the installation position of the reactant analysis device is not specifically limited.

Figure 23:
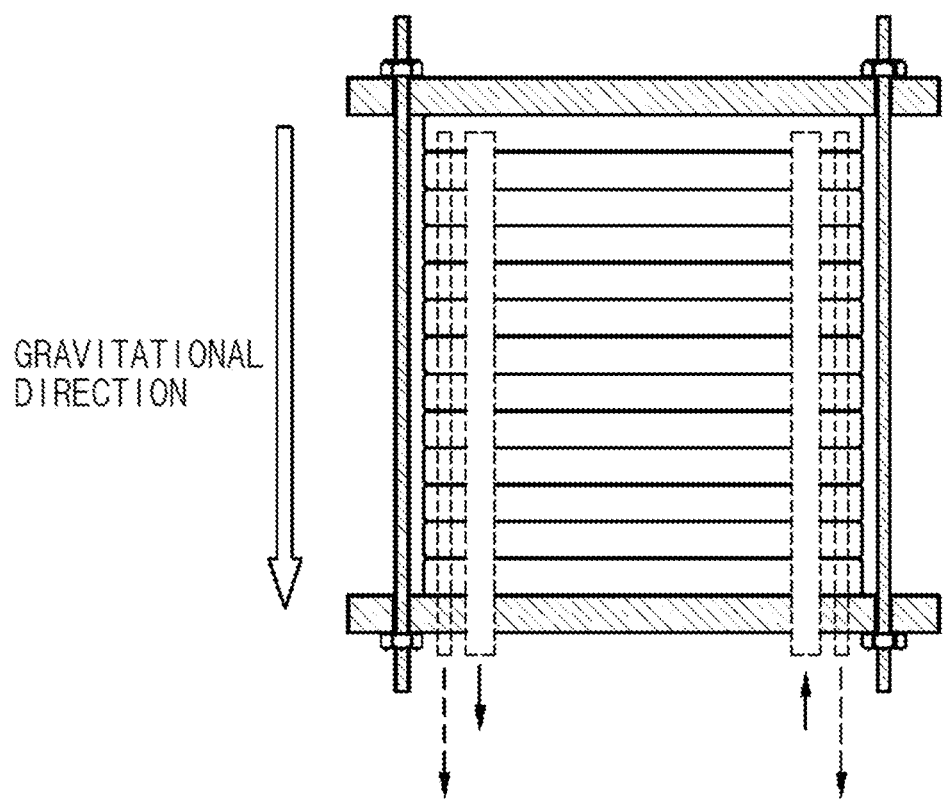
FIG. 23 is a view illustrating a state in which the REDOX flow battery according to the present invention is disposed to extend in a gravitational direction.

According to the present invention, the drawing illustrates that the main channel 1 of the stack 10 and the collection channel 2 extend in a horizontal direction. However, as illustrated in FIG. 23, the electrochemical reaction surface (i.e., collection channel 2) of the stack 10 extends in a gravitational direction or in a substantially gravitational direction to facilitate storage and collection of the reactant. This is because the leaked reactant flows in the gravitational direction. That is, when the electrochemical reaction surface extends in the gravitational direction or substantially gravitational direction, the leaked reactant is collected in a space under the reactant storing and collecting means and cannot be discharged to the outside of the stack 10. The direction in which the stack 10 is arranged is not limited to the gravitational direction but it may be a direction perpendicular to the gravitation direction.

According to the present invention, the reactant storing and collecting means may be disposed in either the outside or the inside of the stack, or may be disposed both outside and inside the stack 10. The reactant that is likely to leak can be collected and stored by the reactant storing and collecting means disposed inside or outside the stack 10 to be returned to the reactant storage tank 20 or 30, or to be discharged outside. In addition, by applying a pressure to the reactant storing and collecting means or injecting a certain material, it is possible to suppress the leakage of the reactant, dramatically reducing damage to parts attributable to leakage of the reactant that may occur with time, and reducing maintenance cost.

Although leakage of a reactant is described in the embodiment, leakage of a product generated by the parts in the stack also can be prevented. For example, a gas generated from an electrolyte also can be collected not to be discharged outside.

Although the present invention has been described with reference to preferred embodiments for illustrative purposes, the present invention is not limited to the specific embodiments but should be construed according to the accompanying claims. In addition, those skilled in the art will appreciate that various modifications, additions and substitutions are possible, without departing from the scope and spirit of the invention as disclosed in the accompanying claims.

The invention claimed is:

1. A REDOX flow battery or fuel battery, comprising:
two or more end plates; and
a stack disposed between the end plates, the stack comprising a plurality of unit cells each comprising a frame having two or more collection channel penetration holes;
a reactant storing and collecting unit for preventing leakage of a reactant, the reactant storing and collecting unit disposed inside the stack,
each of the plurality of unit cells comprises the frame, a membrane-electrode assembly and a separator that are adjacent to the frame;
the frame further comprises one or more main channel penetration holes, and an internal channel recess that fluidly connects the one or more main channel penetration holes and the membrane-electrode assembly to each other;
the one or more main channel penetration holes form a main channel through which the reactant is supplied to the stack;
the internal channel recess forms an internal channel to supply the reactant from the main channel to the membrane-electrode assembly;
the two or more collection channel penetration holes are formed outside the one or more main channel penetration holes and are provided outside the membrane electrode assembly to form the reactant storing and collecting unit for preventing the leakage of the reactant;
the reactant storing and collecting unit comprises at least one collection channel; and
the two or more collection channel penetration holes of the plurality of unit cells form the at least one collection channel to collect the leakage of the reactant; and
wherein the frame further comprises a first sealing portion and a second sealing portion; and
the two or more collection channel penetration holes are disposed between the first sealing portion and the second sealing portion;
the two or more collection channel penetration holes are connected to two or more collection channel recesses, wherein the two or more collection channel recesses are configured to enable the reactant collected from the stack to move to the reactant storage and collection channel of an adjacent unit cell of the plurality of unit cells.

2. The REDOX flow battery or fuel battery according to claim 1, wherein a pressure or a material is applied to the at least one collection channel.

3. The REDOX flow battery or fuel battery according to claim 1, wherein a porous material is introduced into the at least one collection channel.

4. The REDOX flow battery or fuel battery according to claim 1, wherein an insertion member is inserted in the at least one collection channel; and the insertion member is provided with an opening at one side thereof, thereby storing and collecting the reactant that is leaked.

5. The REDOX flow battery or fuel battery according to claim 1, wherein the frame is provided with a hollow connection member connected to the at least one collection channel.

6. The REDOX flow battery or fuel battery according to claim 1, wherein the stack is provided with an anode reactant introduction hole, an anode reactant discharge hole, a cathode reactant introduction hole, and a cathode reactant discharge hole, and is provided with one or more material introduction and discharge unit serving as the reactant storing and collecting unit for preventing the leakage of the reactant.

7. The REDOX flow battery or fuel battery according to claim 1, wherein an electrochemical reaction surface of the stack is disposed to extend in a gravitational direction or in a substantially gravitational direction to easily store or collect the reactant.

* * * * *